US008426791B2

(12) United States Patent
Silver

(10) Patent No.: US 8,426,791 B2
(45) Date of Patent: Apr. 23, 2013

(54) SOLAR PHOTOVOLTAIC SUPPORT AND TRACKING SYSTEM WITH VERTICAL ADJUSTMENT CAPABILITY

(76) Inventor: Charles Silver, Saugerties, NY (US)

( * ) Notice: Subject to any disclaimer, the term of this patent is extended or adjusted under 35 U.S.C. 154(b) by 351 days.

(21) Appl. No.: 12/592,374

(22) Filed: Nov. 24, 2009

(65) Prior Publication Data

US 2011/0120523 A1    May 26, 2011

(51) Int. Cl.
*G01C 21/02*    (2006.01)
*F24J 2/38*    (2006.01)
*B61L 11/08*    (2006.01)

(52) U.S. Cl.
USPC ..................... 250/203.4; 126/577; 136/246

(58) Field of Classification Search ............... 250/203.4; 126/576, 684, 577, 605–607; 136/246, 251, 136/259
See application file for complete search history.

(56) References Cited

U.S. PATENT DOCUMENTS

| | | | |
|---|---|---|---|
| 4,111,484 | A | 9/1978 | Perkins |
| 4,147,154 | A | 4/1979 | Lewandowski |
| 4,215,410 | A | 7/1980 | Weslow et al. |
| 4,356,812 | A | 11/1982 | Haven |
| 4,368,962 | A | 1/1983 | Hultberg |
| 4,649,899 | A | 3/1987 | Moore |
| 5,224,310 | A | 7/1993 | Edwards et al. |
| 6,239,353 | B1 | 5/2001 | Hall et al. |
| 7,104,064 | B2 | 9/2006 | Hon |
| 7,252,084 | B2 | 8/2007 | Pawlenko et al. |
| 7,444,816 | B2 | 11/2008 | Hon |
| 2004/0216777 | A1 | 11/2004 | Pan |
| 2007/0159836 | A1 | 7/2007 | Huang et al. |
| 2007/0246095 | A1* | 10/2007 | Schaefer ................. 136/246 |
| 2011/0079214 | A1* | 4/2011 | Hon ......................... 126/573 |

* cited by examiner

*Primary Examiner* — Georgia Y Epps
*Assistant Examiner* — Don Williams
(74) *Attorney, Agent, or Firm* — Lawrence D. Cutter, Esq.

(57) ABSTRACT

Installation of solar energy systems is made easier through the use of augur tubes. The base augur tube accommodates telescoping sections which enable these systems to exhibit a smaller footprint with enhanced power ratings. A tracking head is provided in which dual axis tracking is provided using a single drive mechanism. These features are employed either together or independently.

10 Claims, 24 Drawing Sheets

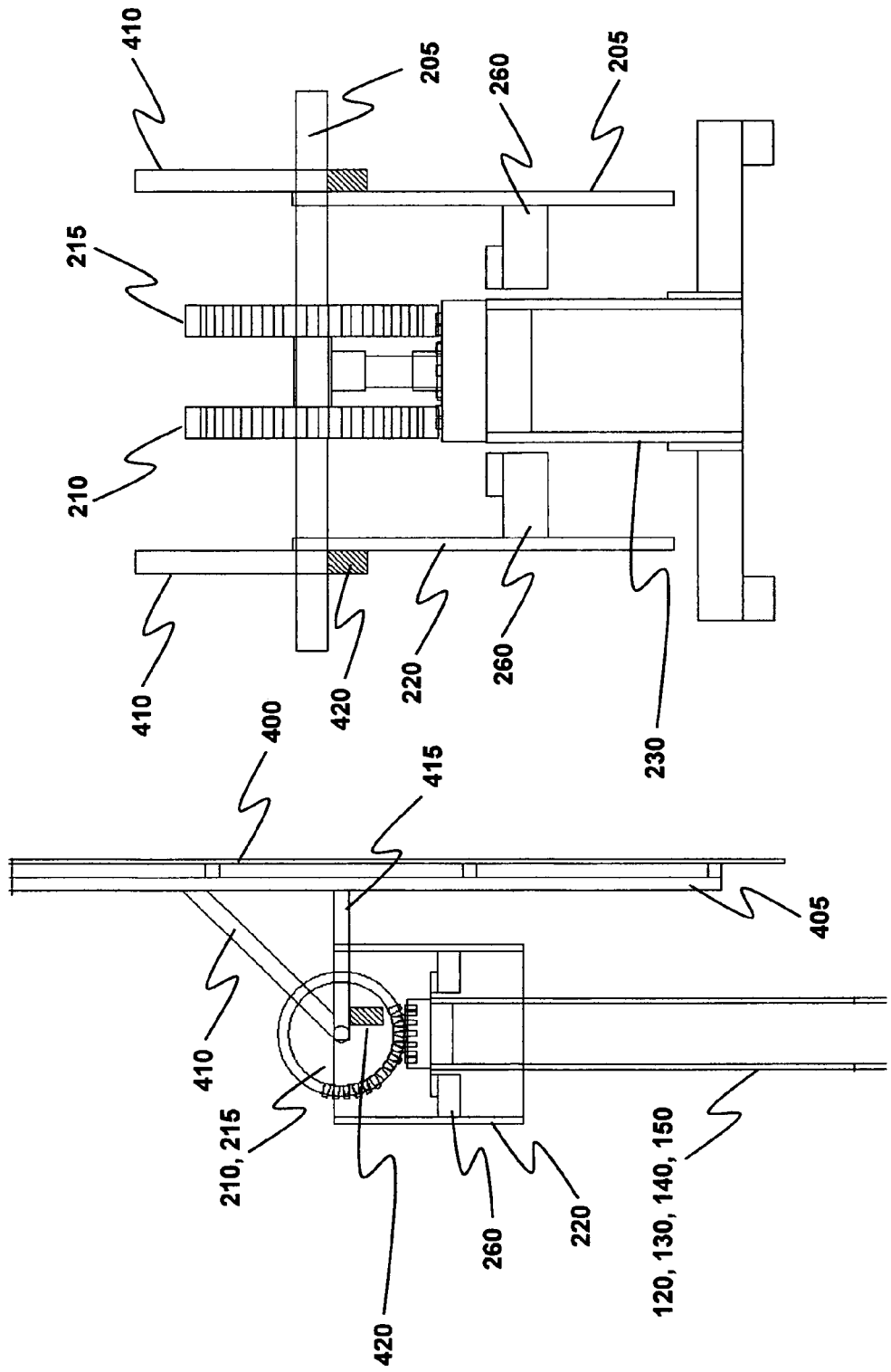

SOLAR PHOTOVOLTAIC SUPPORT AND TRACKING SYSTEM WITH VERTICAL ADJUSTMENT CAPABILITY

TECHNICAL FIELD

The present invention is generally directed to solar photovoltaic energy systems. More particularly, the present invention is directed to methods and systems which provide economic and efficient solar photovoltaic generation system installations and structures. Even more particularly, the present invention is directed to the construction, structure and installation of solar photovoltaic systems in multi-post configurations that address the issue of installation area (especially as measured in terms of square feet per kilowatt-hour). Additionally, the present invention is directed to providing a dual axis tracking mechanism that works in a cooperative fashion with the installation and structural features of the invention. The present invention is also directed to single-post solar energy systems disposed in locations where wind conditions or obstruction avoidance are issues.

BACKGROUND OF THE INVENTION

Issues of energy independence, global warming, the reduction of greenhouse gas emissions, especially $CO_2$, the reduction of dependence on fossil fuels as a source of energy and even issues of national security have recently melded into a desire to focus energy generation on renewable resources. In particular, wind, solar thermal and solar photovoltaic technologies have been seen to positively affect all of these issues. The present invention is directed to the construction, installation and use of solar photovoltaic systems and it is these systems that are predominantly described herein. However, those skilled in the solar energy arts also realize that the ideas described herein are also applicable to solar thermal systems as well, although the advantages to be gained are not generally regarded as being as great as those for solar photovoltaic systems.

Given the need and desire to deploy solar energy collection systems, especially solar photovoltaic systems, it is known that certain obstacles exist. One of the most significant of these obstacles is the need to render the "footprint" of such systems as small as possible. Another need in the solar photovoltaic arts is to provide installations which are minimally affected by wind conditions. As should be appreciated, greater reductions in cost are obtained by having as much solar photovoltaic cell area present on a given mast or support structure. However, the larger the solar photovoltaic array, the greater is the horizontal load generated by local wind conditions. Accordingly, support structures for solar photovoltaic systems should be able to withstand local wind conditions. These wind conditions are often exacerbated by the desire to mount solar photovoltaic arrays at heights which might be needed to avoid shading factors from local trees, buildings, terrain based structures or other shade generating entities. Furthermore, the need to design for high wind loads adds to the overall cost of the system by requiring heavier duty construction elements.

It is also noted that there are two basic mounting systems for solar photovoltaic arrays. One of these systems is the so-called roof mount. These systems tend to be fixed, that is, once installed, they are not orientable. As is also known, being able to orient a solar photovoltaic array provides significant advantages in terms of efficiency. Those skilled in the meteorological and geoscience arts fully appreciate the fact that earthly seasons are generated in opposite fashions in the northern as opposed to the southern hemisphere because of the incidence angle of sunlight, thus clearly demonstrating the desirability of angling solar photovoltaic arrays so that they point directly to the sun. Unfortunately for such fixed systems, the sun moves from east to west during the day and from more nearly overhead positions during the summer to more nearly horizontally positions during the winter. It is noted, however, that the summer to winter transitions occur in an annual as opposed to a diurnal cycle; that is, these latter variations occur over a much longer period of time. These variations in solar position make fixed systems significantly less efficient. Accordingly, it would be desirable to have an inexpensive solar photovoltaic installation which tracks the sun in both horizontal and vertical directions.

Roof mounting of solar panels, as opposed to post-mounted systems, exhibit several problems that militate against their use. Firstly, a roof may be oriented in a direction that does not allow significant southern exposure (northern exposure in the southern hemisphere). The roof may also be tilted poorly with respect to light capture. The roof may also be too small to accommodate the desired number or weight of solar panels. The roof may also be lacking in structural strength sufficient to accommodate the desired solar panel weight. Additionally, roof mounting not only makes panel maintenance difficult but also potentially unsafe. Roof maintenance or replacement is also made more complicated and often involves removal and reinstallation of the solar panels. It should also be noted that photovoltaic systems are sensitive to thermal conditions in that higher substrate temperatures lead to lower energy output. In this respect then, it is seen that post-mounted systems exhibit advantages in that they generally have more exposed surfaces for easier cooling.

This is not, however, the whole story. It is noted that even if one were to provide a tracking system which, on a daily basis, simply rotated a solar photovoltaic array about an axis perpendicular to the ground, this would still be less than 100% efficient since the sun courses through an arc well above the horizon. Such a tracking system is ideal only if the sun were to track along the horizon, which it clearly does not. Thus, even on a daily basis, dual axis tracking for solar photovoltaic arrays is seen to be desirable. However, systems for tracking are expensive, often adding from about $4,000.00 to about $7,000.00 to the cost of each post-mounted array, with the lower number being more likely to be able to only purchase a single-axis tracking system. This represents a significant fixed cost that leads many otherwise interested parties to eschew solar photovoltaic systems. In other words, the cost of entry becomes too high for many. This is especially true since many of these systems are installed under financing arrangements whose long term financing schemes add a multiplying factor to each dollar that is needed for an installation.

From the above, it is seen that fixed solar photovoltaic systems have limitations. Since roof mounted systems tend to be fixed in orientation, unless they can be provided with some form of orientable mounting structure, it is seen that ground mounted post-support systems have an advantage. With respect to ground mounted systems, it is seen that the typical installation begins with the establishment and pouring of a concrete foundation or footing. The cost of concrete, site preparation and cleanup are significant elements in the overall cost of the system and, as pointed out above, provides yet another adoption avoidance factor that deters the construction of new installations. Additionally, the use of a concrete (or cement) base adds to the time it takes to install a new solar photovoltaic system. Such structures require one crew to dig the foundation, another possible crew to pour the concrete and a third crew to place the post and solar photovoltaic array in place. This installation modality is thus seen to be not only labor intensive and thus costly, it is also seen to take time while the concrete is cured to a point where it is capable of supporting the mast and the array.

In summary then, it is seen that desirable solar energy systems should employ easily and quickly installable pole structures that provide wind protection, shade avoiding capabilities and the opportunity to easily include single or dual axis tracking capabilities. From the above, it is therefore seen that there exists a need in the art to overcome the deficiencies and limitations described herein and above.

SUMMARY OF THE INVENTION

The shortcomings of the prior art are overcome and additional advantages are provided through the use of several structural features which also provide modes of operation which enhance the efficiency and lower the cost of installation while still improving the cost per kilowatt-hour. The present invention comprises a cooperative set of features working together to enhance the deployment of solar energy systems, especially solar photovoltaic systems. While these features operate in a cooperative manner, any one of them may be deployed independently of the other to enhance either collection efficiencies or to lower the installation cost.

The first cooperative feature of the present invention is the use of a lower (in ground) pole mount comprising a hollow tube with exteriorly disposed augur plates with which the pole base is inserted into the ground. This avoids the typical poured concrete foundation. It also avoids the problems associated with excavation and the generation of spoils which need disposal.

The second cooperative feature of the present invention is the use of a second or upper pole mount structure which telescopes with respect to the lower or in ground portion of the pole mount. In short, one embodiment of the present invention employs a telescoping pole mount. Such mounts are advantageous in that they permit staggered placement of the solar panels, to better compensate for shading issues, and the ability to lower the array(s) in unfavorable wind conditions. It is noted that the present invention is not limited to the use of merely two telescoping elements but may employ as many as practicality dictates. Furthermore, the telescoping elements may either be adjustable in height or fixed at time of installation. It is additionally noted that the telescoping and auguring aspects of the present invention are employable to support structures (other than solar panels) such as signs, particularly signs which include electrical components which need servicing, since the present invention provides an easy mechanism to lower such signage for maintenance or in windy conditions.

The third cooperative feature of the present invention is the employment of a tracking head which is mounted on the upper (or uppermost) pole section. In its broadest scope the present invention employs solar trackers of any practical design. However, the present application introduces a dual axis tracking head which provides several important features. In particular, the preferred tracking head comprises one designed to provide inclinational tracking (up and down movement) as a direct consequence of the horizontal (left and right) tracking motion. In particular, the present invention preferably employs a tracking head in which there is a mechanical link between the horizontal drive mechanism and the vertical drive mechanism. The fact that the upper(most) portion of the pole mount telescopes with the lower (most in ground) portion also provides a structure in which one pole section rotates within another to provide the horizontal tracking motion. Alternatively, rather than having a pole segment rotate, the rotation feature may instead be deployed in the tracking head, which is the preferred modality herein.

As pointed out above the three features described herein may be employed together, which is preferred, but may also be deployed independently of one another. Additional features and advantages are realized through the techniques of the present invention. Other embodiments and aspects of the invention are described in detail herein and are considered a part of the claimed invention.

Accordingly, it is an object of the present invention to provide solar energy providing systems which are installed easily, quickly and at a lower cost.

It is also an object of the present invention to provide a solar energy system which is protected against unfavorable wind conditions.

It is yet another object of the present invention to provide a solar energy system which occupies a smaller footprint, that is, one which takes up less "real estate."

It is a still further object of the present invention to provide a solar energy system which reduces or prevents shading of one collector by another.

It is also an object of the present invention to provide a solar energy system in which pole heights are increased to provide an improved method of avoiding obstacle shading while maintaining the ability to be lowered in adverse wind conditions.

It is still another object of the present invention to provide a solar energy system which can advantageously incorporate a dual axis tracking head.

It is also an object of the present invention to provide a solar energy collection system with more flexible installation parameters, especially in terms of footprint (area, say in square feet) versus system rating (power as in kilowatts).

Lastly, but not limited hereto, it is object of the present invention to provide a solar energy system which lowers the barriers for those in the process of deciding whether or not to deploy a solar energy collection system The recitation herein of desirable objects which are met by various embodiments of the present invention is not meant to imply or suggest that any or all of these objects are present as essential features, either individually or collectively, in the most general embodiment of the present invention, or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 14B is a side elevation view that more particularly illustrates the attachment of a solar panel to a tracking head of the present invention;

FIG. 14C is a side elevation view similar to that shown in FIG. 14B except that it is rotated by 90°.

DETAILED DESCRIPTION

There are multiple aspects to the present invention. Nonetheless, the features disclosed herein may usually be employed independently of one another. It is, however, preferable to employ all of them simultaneously to provide an array of solar collectors which are easily, quickly and economically installed while at the same time providing an array system for which shading problems are either reduced or eliminated and while also providing a flexibly controllable dual axis tracking system. It is noted, however, that the augur system for installation may be employed whether or not a tracking or telescoping system is employed. Likewise, the telescoping system may be employed in more standard poured foundation systems whether or not the tracking head described herein is employed. The tracking head described herein may also be employed whether or not an augur base or telescoping poles are employed. In general, though, it is preferred that all of these features be deployed in the same system in order to achieve its maximum advantages.

Figure 1:
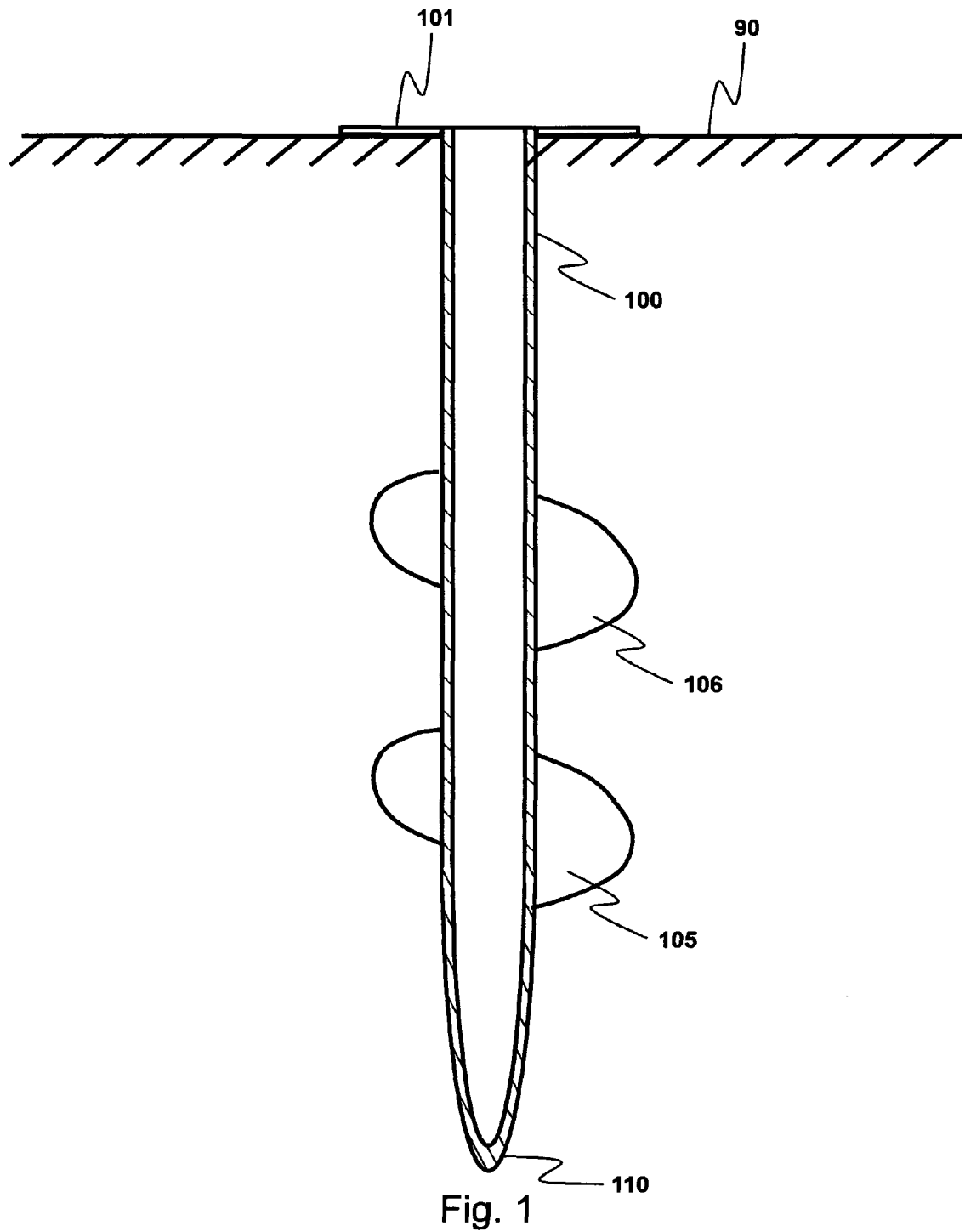
FIG. 1 is a cross-sectional, side elevation view of a lowermost pole section showing exteriorly mounted augur plates.

The benefits of the present invention begin with its installation aspects. The present invention preferably employs a ground based segment forming the lowest portion of the supporting pole structure for a single solar panel or a group of panels. The solar panel is typically a photovoltaic device but may also include a solar thermal panel as well. Clearly, combined photovoltaic and thermal panels are employable with the support and mobility structures of the present invention. The invention preferably employs hollow augur base segment 100 in FIG. 1. Augur base segment 100 includes externally disposed augurs or screw plates 105 and 106. The number, size and placement of augur plates employed is a design choice based most strongly on soil, ground and other subterranean conditions. The augur plates may also be disposed in a continuous fashion as is found in a standard wood screw albeit on a far larger scale. Base segment 100 is hollow and is provided with pointed end 110. Base segment 100 also preferably includes ground plate 101 which lies flush with ground 90 at the end of its insertion. Ground plate 101 is sized to provide stability suitable to local soil conditions.

It is noted though that the benefits of the present invention do not end with the benefits of an easier and less expensive installation. In particular, the ability to lower the panels provides advantages for cleaning and maintenance. The present invention enables the panels to be lowered and positioned horizontally or vertically for easy cleaning. The capability of easy cleaning on a regular basis provides yet another way in which solar energy collection efficiency is improved. Otherwise, dust and various other forms of detritus can accumulate and impair functionality. Additionally, Initial installation of the panels onto their support mounts is performed with the posts in a lowered position, eliminating the need for working on ladders or scaffolds. Also, the present invention is advantageous in certain regions in winter months when snow accumulation is a problem. Snow accumulation tends to be more of a problem at midday. However, the ability to tilt downward "at will" makes both automatic and manual snow removal possible.

Base segment 100 is inserted into the ground via rotary motion. Such motion is provided by well known and available external drive mechanisms. The drive mechanism grips base segment 100 and turns it to drive it into the ground. A pilot hole may be provided to aid installation. Additional augur plates may also be disposed closer to tip 110 than is shown in the figures herein. Installation may also be accomplished with the aid of a rod (not shown) which is slipped through opposed holes (also not shown) in the side of base segment 100 to form a Tee-shaped structure. For installation a torque is applied to one or both ends of the rod. Ground segments of the present invention are of the general type available on the commercial market, as exemplified by the mounting systems sold by PierTech Systems, 225 Chesterfield Industrial Blvd., Chesterfield, Mo. 63005. In those embodiments of the present invention in which an auguring installation is not employed, it is not necessary that the support posts exhibit a circular cross section. In these circumstances, any convenient cross section may be employed, including, but not limited to, square, rectangular or hexagonal.

Figure 2:
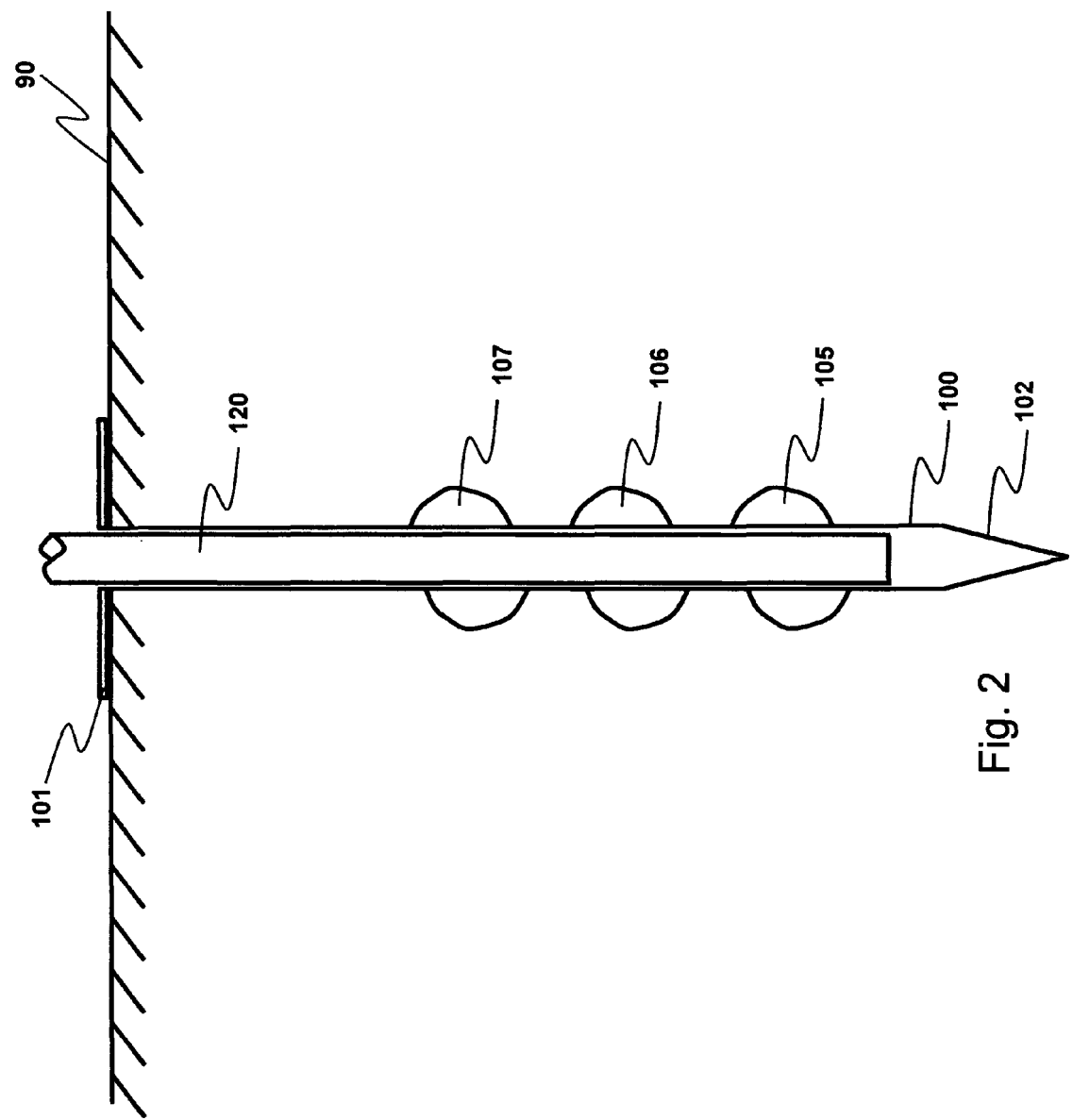
FIG. 2 is a cross-sectional, side elevation view similar to FIG. 1 but more particularly showing an alternative end point and also the placement of one or more telescoping segments.

FIG. 2 illustrates the fact that there are varieties of ways in which augur plates 105, 10 and 107 may be disposed. There is no reason to prefer right hand augurs (screws) over left hand augurs (screws). FIG. 2 also illustrates the fact that the lower end of base segment 100 may be provided with a more pointed shape 102 than that shown in FIG. 1. It is also noted that the end of the lower segment may be provided with a diagonal cut on the end of the segment, much as one sees is provided at the end of a typical hypodermic needle. However, it is to be particularly noted that base segment 100 is at least partially hollow so as to provide a cavity into which first telescoping segment 120 is disposed. Telescoping is provided herein for several purposes. Firstly, it provides a mechanism which reduces or eliminates the effects of shading. Secondly, it provides the ability for the arrays to be lowered in the event that wind conditions become deleterious to further operation. It is noted that this ability to retract in the wind has several advantages. Firstly, it means that less expensive supporting structures (for example, base segment 100 and first telescoping segment 120) may be employed. Secondly, keeping the same structural strength in members 100 and 120, means that elevations to greater heights may be employed. The ability to lower the panels in windy conditions results in the possibility of using lighter weight and lighter duty components in the tracking head and mast support, thus effecting a cost savings.

Figure 3:
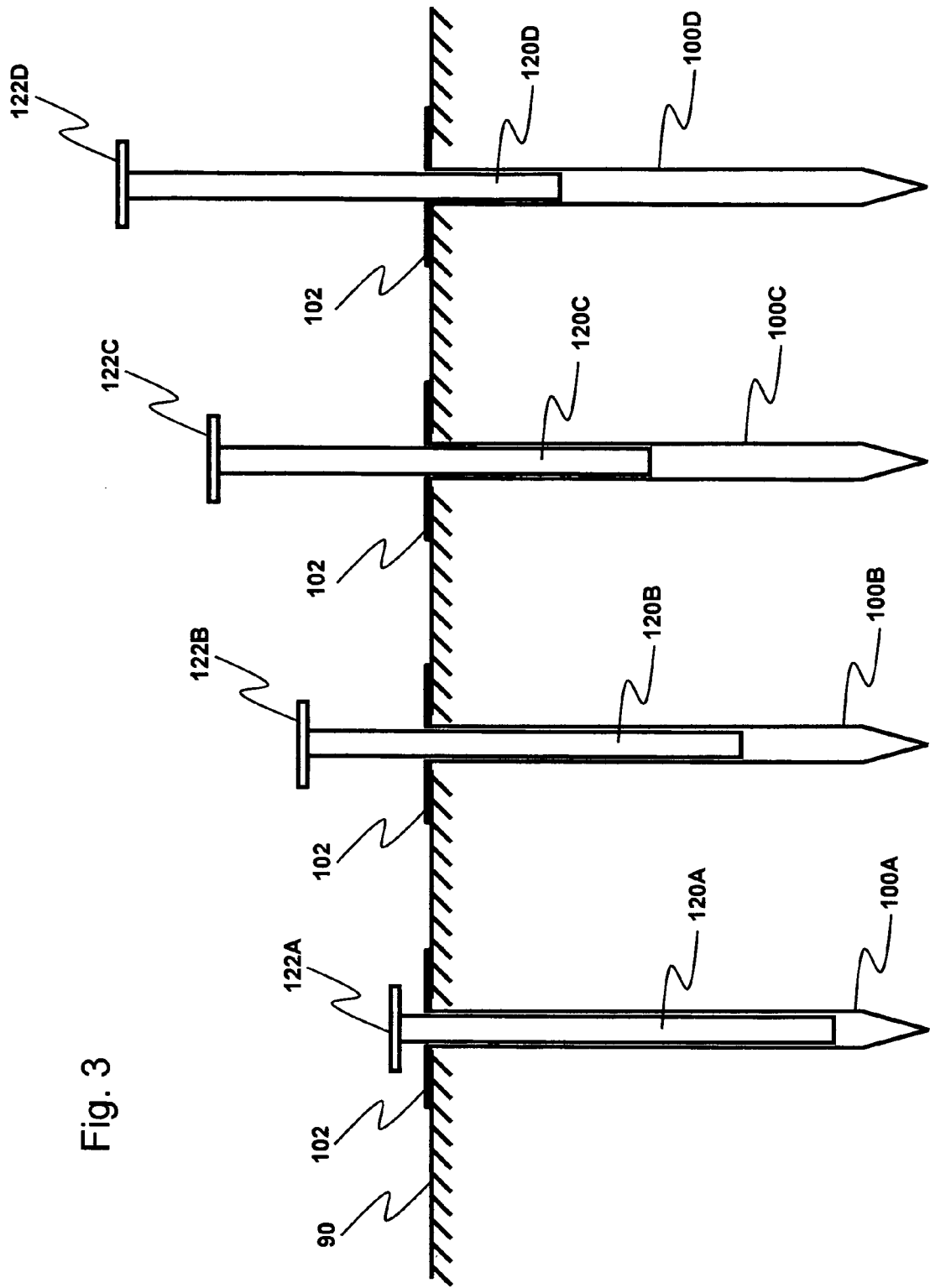
FIG. 3 is a cross-sectional side elevation view illustrating the telescoping structural aspects of the present invention and more particularly illustrating the use of the telescoping feature to reduce or eliminate the problem of shading.

FIG. 3 illustrates the fact that the telescoping features of the present invention provide an array configuration in which a plurality of pole heights are employed, thus reducing or eliminating the effects of shading. The use of the phrase "effects of shading" as used herein is intended to apply to two phenomena: the shading of one solar panel by another and also to shading produced by surrounding or adjacent structures and/or foliage. The parts labeled with reference numerals followed by letters in FIG. 3 are meant to correspond. The letter designations indicate poles disposed at various heights to eliminate or reduce any of the shading effects discussed herein. Structures having a "D" in their designation are the poles positioned at the highest of the four levels shown. Structures having an "A" in their designation are the poles positioned at the lowest of the four levels shown. The present invention is, however, not limited to four levels or to any particular number of levels. To take advantage of the fact that telescoping eliminates or reduces the effects of one panel shading another, there must, of course, be at least two rows (levels) with the panels facing in substantially the same direction. However, even a single pole having a telescoping ability is capable of providing advantages in wind related operations and in obstruction avoidance. Lastly, with respect to FIG. 3, it is noted that pole locations A-D are provided with telescoping portions 120A-120D, respectively, which include support platforms 122A-122D, respectively, for mounting a solar panel or a tracking head for mounting and orienting a solar panel. In the present invention support platforms 122A-122D support tracking heads or are replaced by directly mounted tracking heads. For example, tracking heads (such as 200 in FIG. 8) may be bolted, screwed or otherwise affixed to the uppermost pole segment (120A-120D in FIG. 3; 130 in FIG. 4; 150 in FIG. 5).

Figure 4:
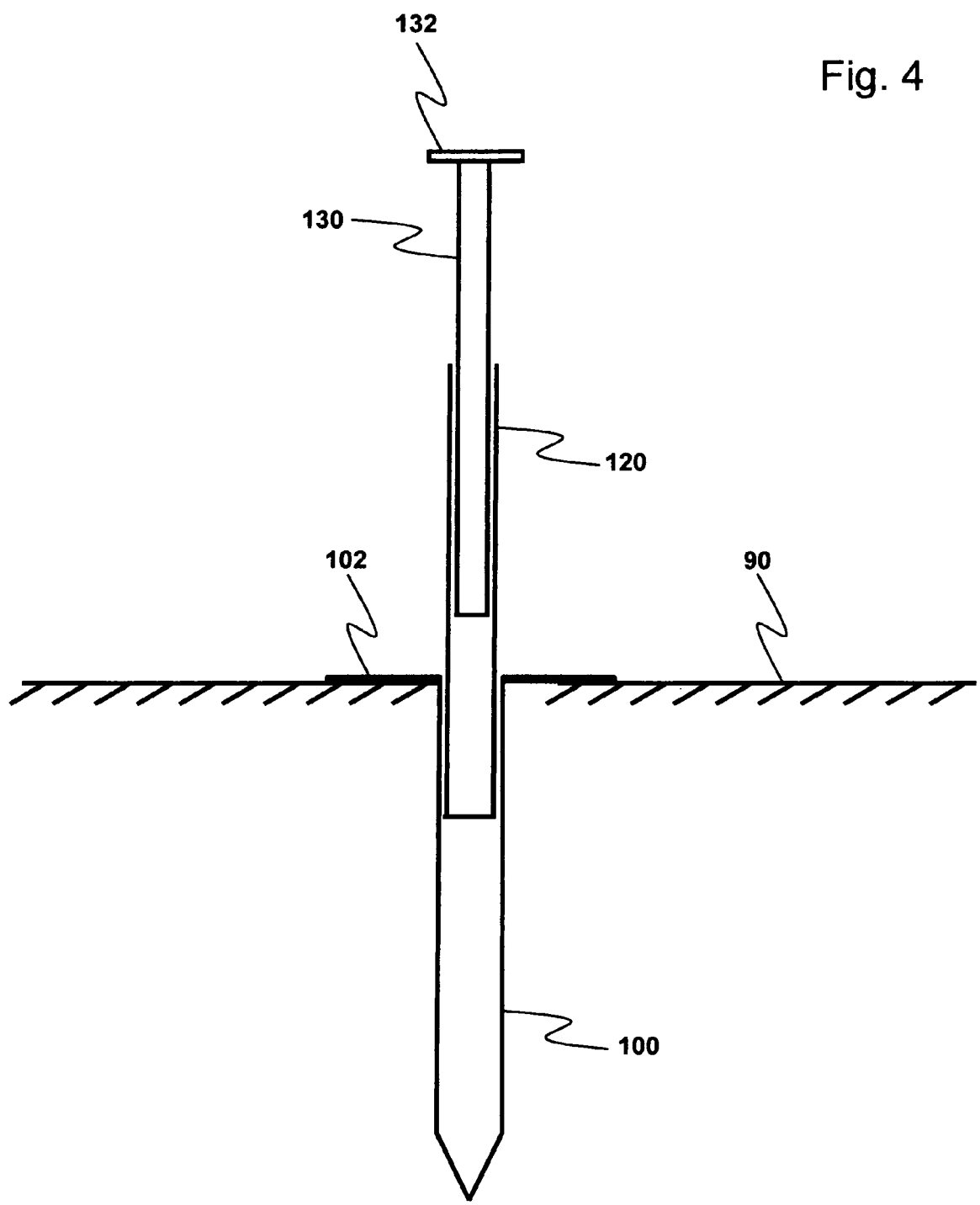
FIG. 4 is a cross-sectional side view illustrating an embodiment of the present invention in which the telescoping aspects employ two telescoping segments in addition to the base segment.
Figure 5:
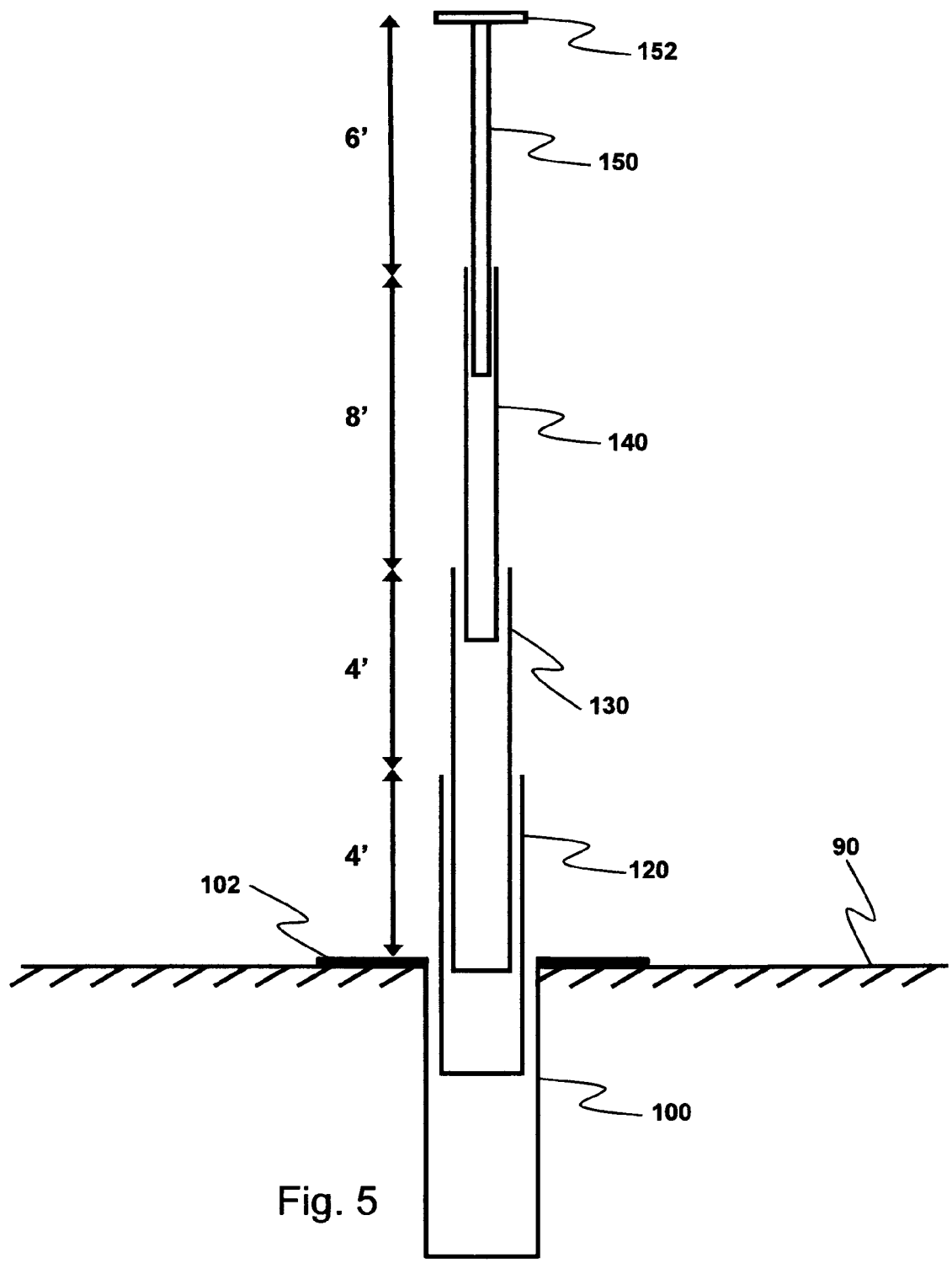
FIG. 5 is a view similar to FIG. 4 except that a plurality of telescoping segments are employed.

FIGS. 4 and 5 are intended to show that the pole structure may include more than one section or segment that telescopes out of base segment 100. In FIG. 4 there are shown two upper pole segments 120 and 130 that telescope out of base segment 100. Platform support 132 may be disposed atop segment 130. Likewise, FIG. 5 illustrates the situation where there are four telescoping sections 120-150 and one base sections 100. Base section 100 is preferably disposed in the ground and is preferably placed therein by the augur process described above. However, it is still within the scope of the present invention, especially with respect to its telescoping aspects, that base segment 100 be disposed in a conventional poured concrete foundation or even disposed within a pre-bored hole, as opposed to having been installed via auguring. FIG. 5 also illustrates the fact that the telescoping sections may be of varying height (that is, length). The lengths may be chosen to provide flexibility in extension, so that no one telescoping section has to be extended its full length. This is useful in adjustments made in total height in response to wind conditions. For ease of drawing, FIGS. 4 and 5 do not include the augur plates. It is also noted, however, that in one embodiment of the present invention, the installation described herein is also employable in those circumstances in which the height of the poles is fixed and no telescoping occurs after installation. In such circumstances, the telescoping elements are affixed at selected heights by any convenient mechanical device, including collars, clamps, rods or pins through holes in the elements, screws or bolts.

Figure 6:
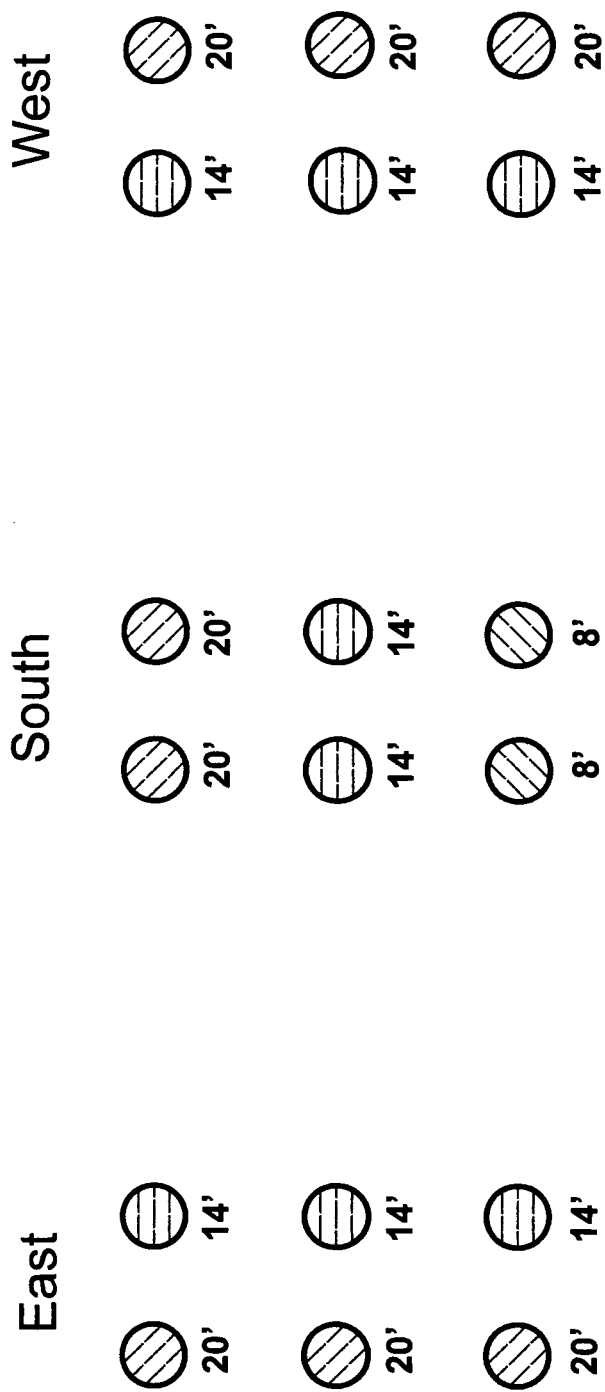
FIG. 6 a top view illustrating pole heights employed at three different sun positions (east, south, west) as they are apt to occur at various times of the day.

Attention is now directed away from an individual pole and collector mount to an array of such poles and collectors. In particular, FIG. 6 shows in a top view a poles-only view of a collector array. For ease of viewing, the collectors are not shown. There are three situations shown in FIG. 6. Each situation is distinguished by the location of the sun with respect to the array. The array shown in each case is one in which there are three rows of collectors and poles. Each row includes two poles (and two collectors, not shown). The different hatching in the pole symbols is intended to indicate different pole heights. The various pole heights are preferably provided by the telescoping capability described herein. Note that the height of the various poles is a function of the size and aspect ratio of the solar panels employed.

With the sun lying to the east of the array (leftmost portion of FIG. 6), the array is adjusted so that three 20 foot poles are disposed to the west of three poles adjusted to a height of 14 feet. As the day progresses, the sun is found to the south of the collector array, as shown in the central portion of FIG. 6. In this position, the pole heights are adjusted so as to provide a back row with two poles having a height of 20 feet, a middle row with two poles having a height of 14 feet and a front row of two poles having a height of 8 feet. As the day progresses even further, the sun is found more to the west of the array. In this position, the arrangement of telescoping pole heights is configured to be the reverse of the arrangement shown in the leftmost configuration of FIG. 6. More particularly, with the sun toward the west, there is provided a configuration of three poles with an extended height of 20 feet disposed behind (with respect to the sun) three poles having a height of 14 feet. This is sufficient to reduce the shading effects of one panel by another for this exemplary situation. Maximum insolation results. It is important to note that the pole heights illustrated in FIG. 6 are exemplary. Actual heights vary depending on panel area, panel dimensions and in situ spacing requirements that are dictated by individual physical location features. Additionally, it is to be noted that FIG. 6 is not meant to imply that there are only three positions employed. In preferred embodiments of the present invention, the heights are continuously adjustable on either a continuous or staged basis, as is the direction in which the panels are facing.

Figure 7:
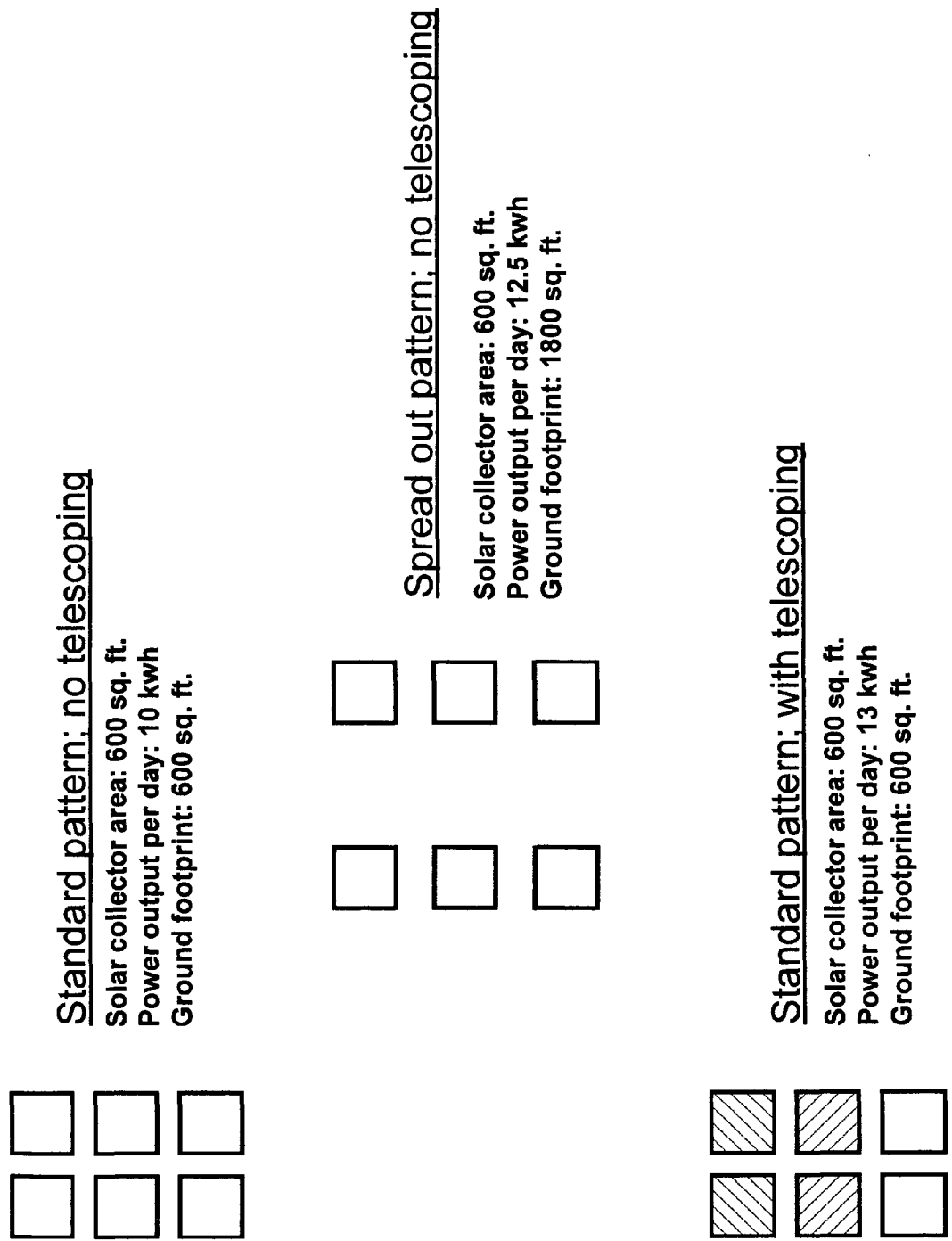
FIG. 7 a top view illustrating the advantages in footprint size obtained through the use of telescoping support posts for solar energy collectors.

Attention is now directed to FIG. 7 which is similar to FIG. 6 except that here the focus is on the collectors themselves, their area (especially as seen from above) the output energy predicted and the total real estate "footprint" taken up by the system. More particularly, FIG. 7 is intended to demonstrate the advantages of telescoping in terms of its ability to provide equal or better energy output while using a smaller footprint. Alternatively, FIG. 7 is interpretable as demonstrating the increase in energy output for a given footprint. In other words, telescoping provides solar energy system designers with heretofore unavailable design tradeoffs. In the upper portion of FIG. 7, it is assumed that there is no telescoping and that the panels are arranged in three rows with two collectors each. In this system, the total solar collector area is 600 square feet. The nominal energy output is 10 kwh (kilowatt hours) per day. However, most importantly for the present discussion, the ground footprint is 600 square feet. In order to avoid shading without telescoping, a more spread out configuration is required, such as that shown in the middle portion of FIG. 7. This configuration employs the same 600 square feet of collector area and produces a nominal energy output of 12.5 kwh per day. However, in order to obtain the higher energy output, the array now "consumes" an area of 1,800 square feet. With the present invention, however, with its use of telescoping poles, it is possible to produce a nominal energy output of 13 kwh in the more compact area of 600 square feet: same footprint as a fixed array, greater energy output per day. This exceeds the output of the conventional tracker. The present invention also achieves this in part by collecting solar energy for a greater part of the day and more particularly by adding available times at the beginning and end of each day in those circumstances where the terrain and local features permit it; but note too that the present invention also provides mechanisms for overcoming some of the local shading conditions.

Figure 8:
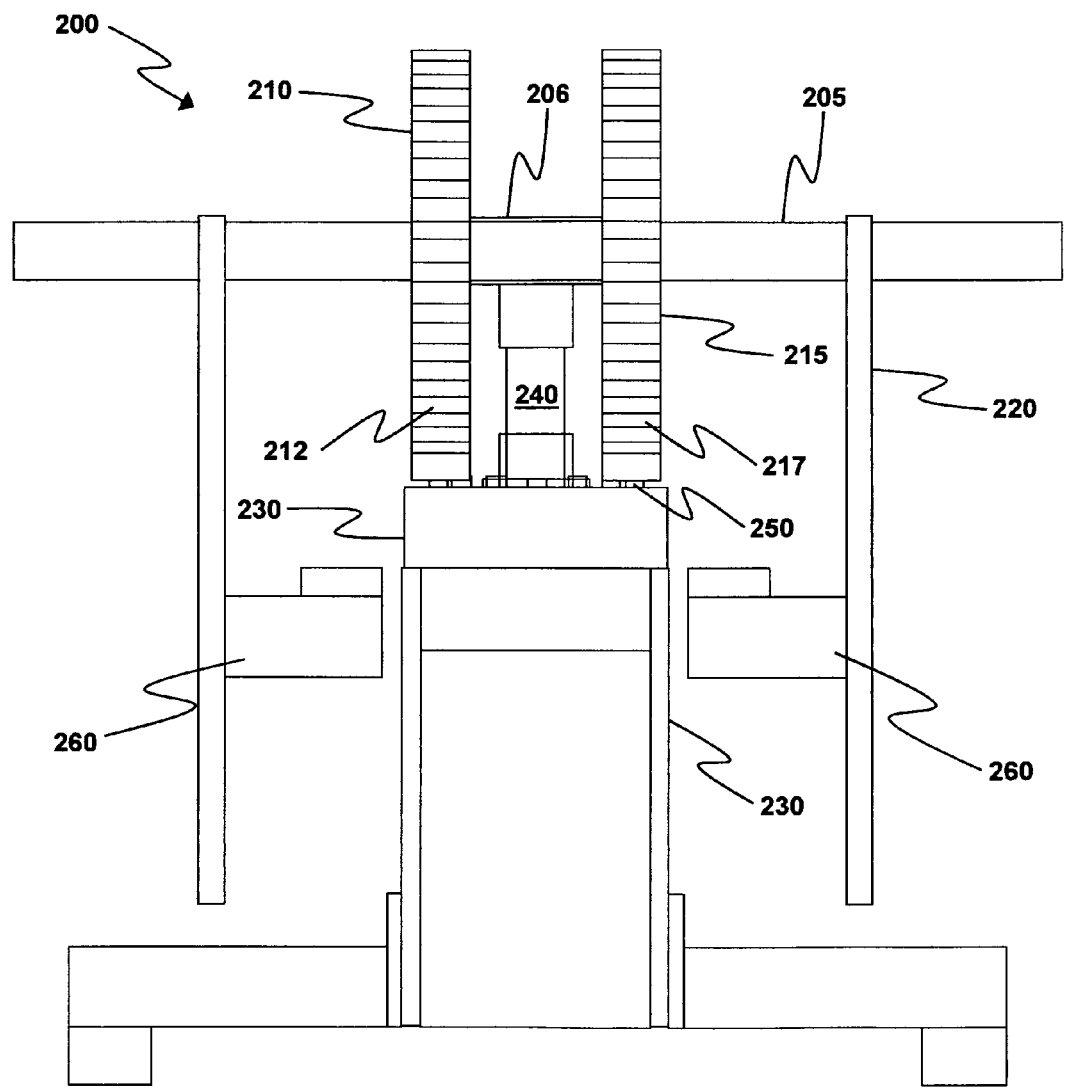
FIG. 8 is a front view of a tracking head in accordance with the present invention.
Figure 14A:
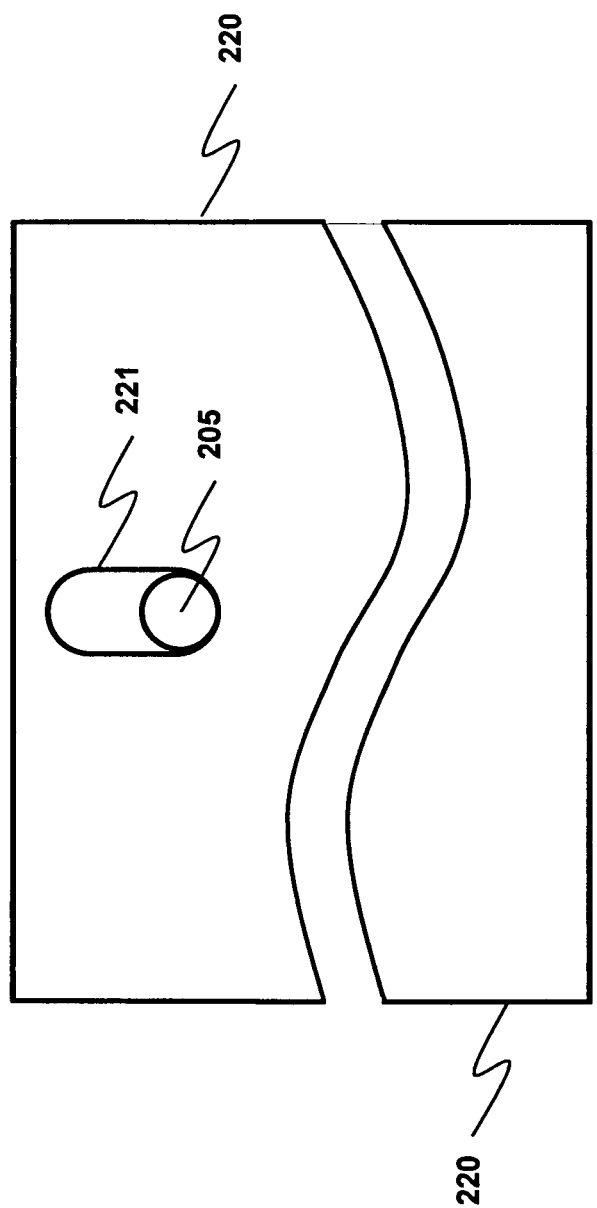
FIG. 14A is a side elevation view which illustrates the mounting of the horizontal shaft in an elongated opening for ease of gear disengagement.

Having considered the advantages to be gained by employing hollow auguring base segments with telescoping segments disposed therein, attention is now focused upon a third aspect of the present invention, namely the use of a tracking head which provides dual axis tracking using a single horizontally rotating drive mechanism. A suitable tracking head 200 for this purpose is shown in FIG. 8. For the purposes of the present invention a tracking head is a mechanism that directly or indirectly couples a solar collector panel to a pole. FIG. 8 illustrates first platform 220 for supporting at least one solar panel. The connection with a solar panel is illustrated in FIG. 14. First platform 220 also includes bearing support 260 which permits relative rotational motion between first platform 220 and second platform 230. Horizontal shaft 205 is disposed with respect to first platform 220 so as to be rotatable about a horizontal axis via apertures 221 as shown in FIG. 14A. In one embodiment of the present invention, first platform 220 comprises a cylindrical structure. Horizontal shaft 205 is supported by bearings disposed in opposed apertures 221 in this cylindrical structure. Shaft 205 carries at least one, and preferably a pair of, circular disks 210, 215 affixed thereto in an opposed and spaced apart configuration. These disks are important aspects in that their motion provides both horizontal (azimuthal) and inclinational rotation of attached solar panels. Disks 210 and 215 include, on the periphery thereof, engagement means 212 and 217, respectively. First platform 220 supports the horizontal shaft so as to enable a solar panel and the first platform to pivot about a vertical axis, a motion which sweeps the panels in a left to right and right to left direction. It is noted that, as used herein and in the appended claims, reference to either first platform 220 or to second platform 230 is merely intended to refer to a support or supporting structure. While such structures are shown herein as being cylindrical, this is not a limitation of the present invention.

There is also provided vertical shaft 240 which supports horizontal shaft 205 and which enables a solar panel and first platform 220 to swing in a horizontal direction. Vertical shaft 240 is supported by second platform 230. Vertical shaft 240 supports sleeve 206 through which shaft 205 is disposed so as to be able to rotate therein. Second platform 230 has second engagement means disposed thereon in contact with the first engagement means, so as to enable the solar panel and said first platform to be pivoted in an inclinational direction upon relative rotation of said first and second platforms. In FIG. 8, second engagement means comprises pegs 250 which engage corresponding apertures or teeth in disks 210 and 215. Engagement means 212 and 217 may also comprise pins or pegs.

The description above refers to first and second engagement means 212 and 217. In a preferred embodiment of the present invention these engagement means are simply intermeshing gears. In another preferred embodiment, the engagement means comprise a peg and slot arrangement. It makes no difference whether the pegs are on disks 210 and 215 or on second platform 230. Both disks should, however, be similarly configured. Engagement means 212 and 217 may also include coatings on the edges of disks 210 and 215 so as to provide friction contact. In fact, any convenient engagement means may be employed. It is only necessary that there be some form of contact between disks 210 and 215 and second platform 230. The key point is that rotation of first platform 220 about a vertical axis with respect to second platform 230 produces a rotation of disks 210 and 215. It is noted, however, that it is preferred that pegs on platform 230 aligning with corresponding apertures in disks 210 and 215 be employed. It is also noted that, while relative rotation of platforms 220 and 230 is intended to produce rotation of disks 210 and 215, pegs 250, arranged in an arcuate pattern (see FIGS. 10, 12 and 13) do not simultaneously engage both of said disks 210 and 215.

It is noted that U.S. Pat. No. 4,368,962, issued Jan. 18, 1983 to Donald E. Hultberg, provides a mechanism for linking rotational motion of the array, intended to keep the panels facing the sun, with tilt motion. However, it is noted that this mechanism is fixed. It does not permit uncoupling of the array and the support post, a feature which is provided by the present invention which is thus rendered capable of making seasonal adjustments to the collector motion.

It is noted that first platform 220 may also be referred to as an upper platform. Likewise, second platform 230 may also be referred to as a lower platform. "Upper" and "lower" are usable in those circumstances which describe the device in use in its standard environment and should not be construed in any way as a limitation for any of the claims herein.

The presence of two disks 210 and 215 and an arcuate arrangement of pins or pegs 250 merits some discussion. In preferred embodiments of the present invention, it is the intention that the arcuate distribution of pegs or pins 250 be such that engagement with both disks (or wheels, if you will) does not occur at the same time. As first platform 220 is rotated with respect to second platform 230, one of the disks engages pins or pegs 250 on second platform 230. This occurs until a maximum angle of inclination occurs. This corresponds to a midday position of the sun. At this juncture, continued rotation about the vertical axis produces a disengagement from the first disk and an engagement with the second disk. Since the disks are mounted on opposite sides of vertical shaft 240, continued rotation now produces a motion which lowers the angle of inclination. The pegs are spaced apart and the apertures in disks 210 and 215 are correspondingly positioned so that relative rotational motion of first and second platforms 220 and 230 produces not only the left-toright sweeping motion of a solar tracker but also a corresponding vertical or angle of inclination tracking motion which more closely aligns the solar panels with the direction of incoming solar radiation. Thus, as the system of the present invention rotates the panels in a left to right direction to track the daily east-to-west course of the sun through the sky, the mechanical linkage between the two platforms operates to first increase the angle of inclination with respect to the horizon until a midday point at which time the other disk (gear) engages and operates to lower the angle of inclination. Alternative linkages may also provide this kind of tracking.

Clearly, an installation with two disks is very much to be preferred. However, it is noted that even a single disk will provide a modicum of improved tracking over half the range. Likewise while pins or pegs are preferred, any kind of frictional contact may be employed. However, pins or pegs are preferred because they provide an opportunity for midyear corrections. As the seasons (in the northern hemisphere) proceed from winter to summer, the initial position of the sun in the morning sky moves in a northerly direction along the morning horizon. Accordingly, this transition renders it desirable to be able to raise shaft 205 upwards using vertical shaft 240 which preferably includes an internal spring or other like biasing device (not visible) which operates to provide a downward force so as to better be able and to reseat it in a different position so that its initial position for tracking purposes is more northerly. Thus the use of pins or pegs provides a mechanism for seasonal adjustment not as readily implemented with a purely frictional contact system. Finer degrees of control are accomplished with more closely spaced pins or pegs. A frictional engagement mechanism would, theoretically, provide unlimited granularity of control but would be subject to potential slippage over time.

Figure 9:
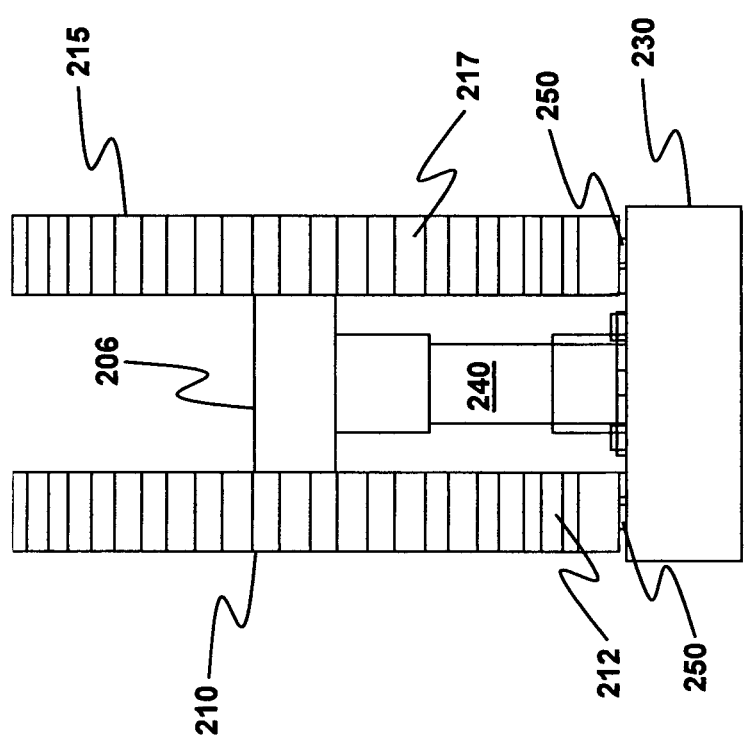
FIG. 9 is a front view of a tracking head in accordance with the present invention similar to FIG. 8 but showing portions of it in greater detail.
Figure 10:
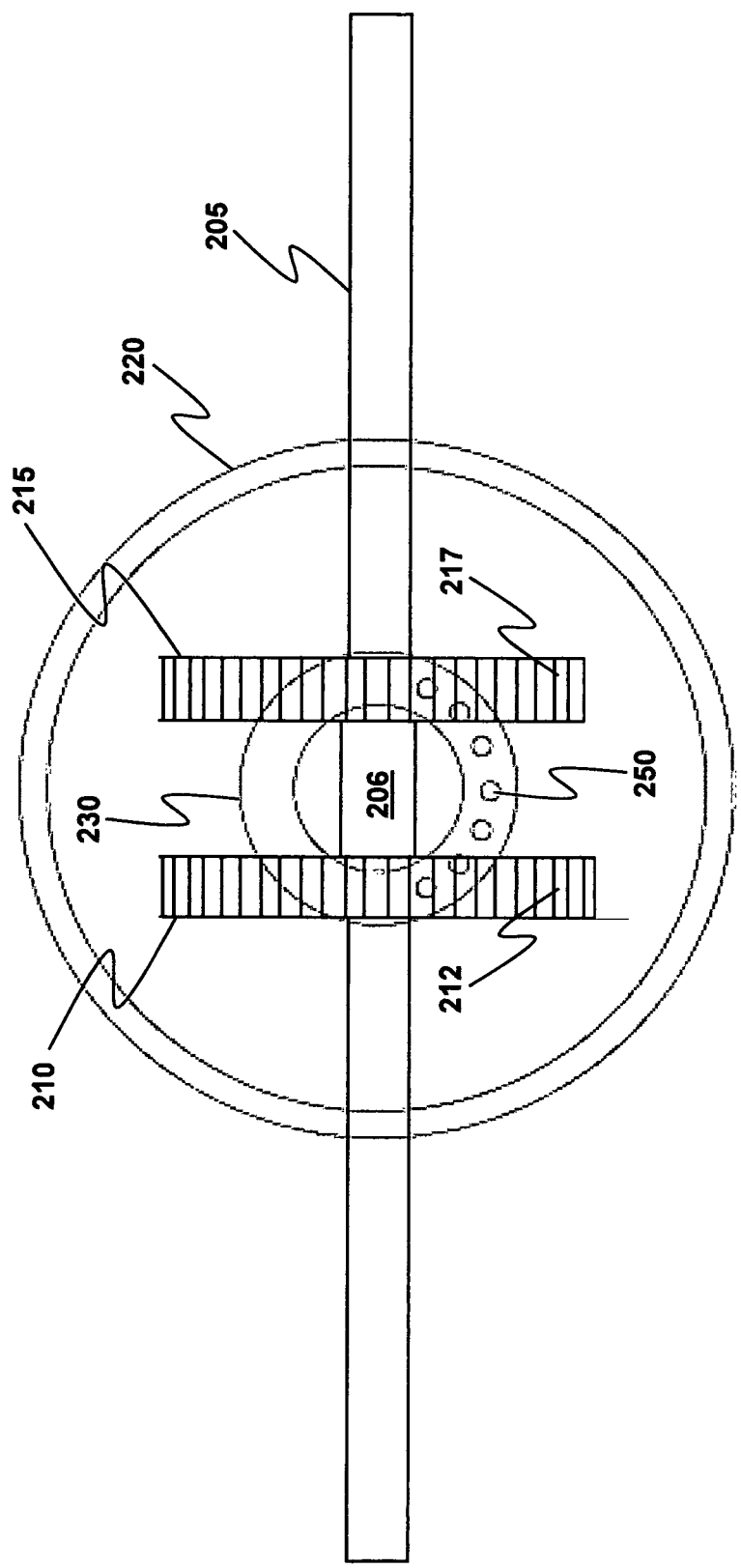
FIG. 10 is a top view of a tracking head in accordance with the present invention.
Figure 11:
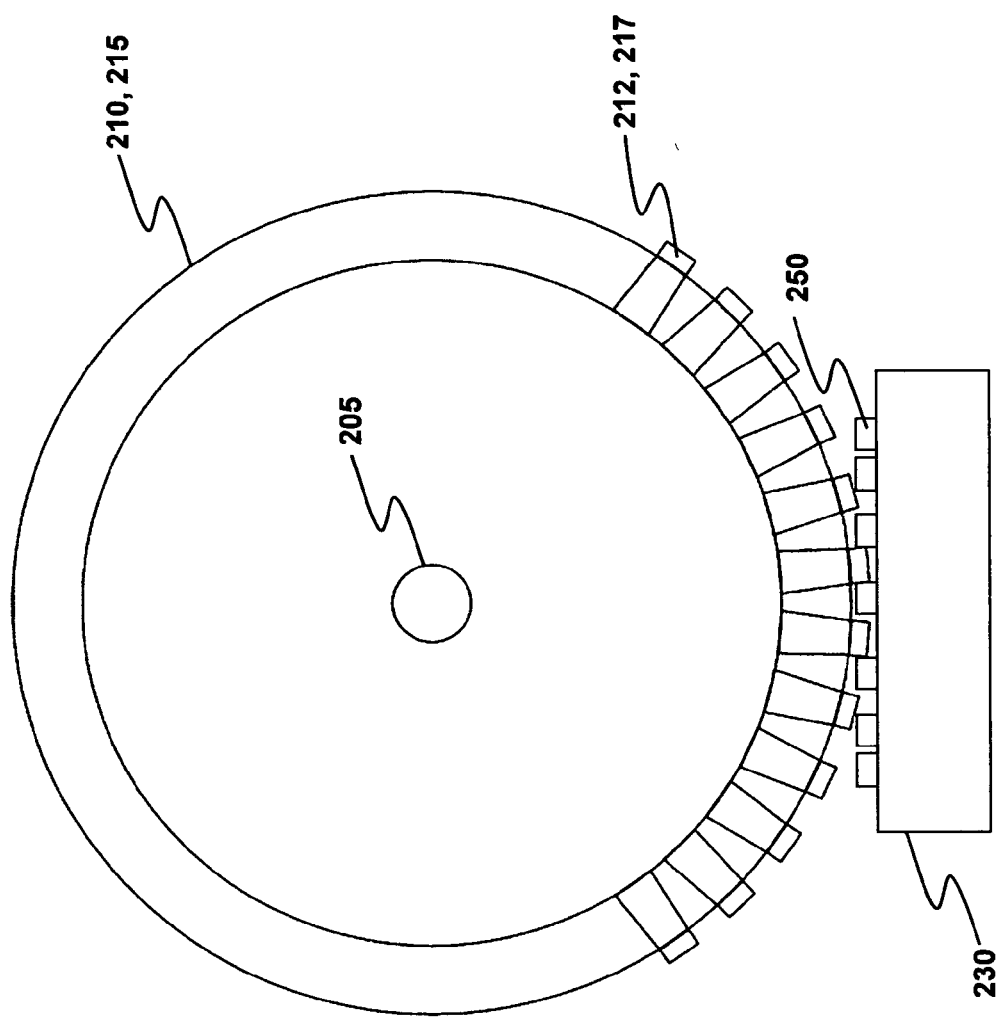
FIG. 11 is a side view of the mechanism shown in FIGS. 8-10 for linking inclinational rotation to vertical rotation.
Figure 12:
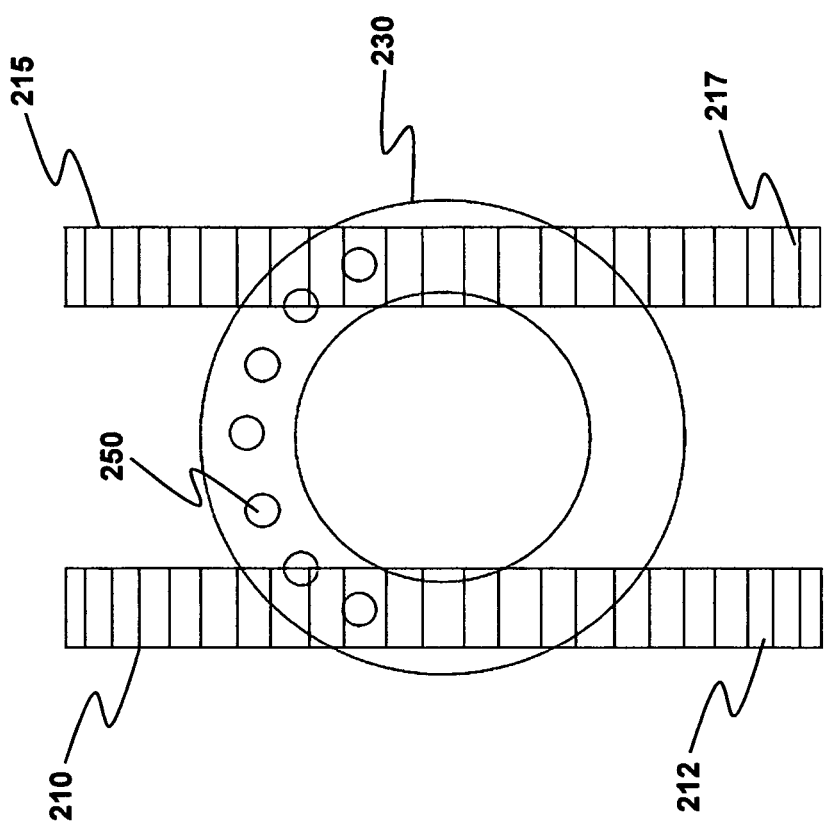
FIG. 12 is a top view of the mechanism shown in FIG. 11 and more particularly illustrates one of the various orientations between the mechanical links which couple the two basic rotary motions employed herein to provide dual axis tracking.

FIG. 9 provides a more focused view than that shown in FIG. 8. FIG. 10 is relevant in that it provides a top view that clearly illustrates that as relative rotational motion occurs between first platform 220 and second platform 230, disks 210 and 215 do not necessarily engage pins or pegs 250 at the same time. It should be particularly emphasized that FIG. 10 is not meant to imply that disks 210 and 215 engage pegs 250 at the same time. The engagement is essentially tangential at the periphery of the disks. This is made more evident in FIG. 11. Likewise, it should be noted that FIG. 12 is also not intended to show simultaneous engagement.

Figure 13:
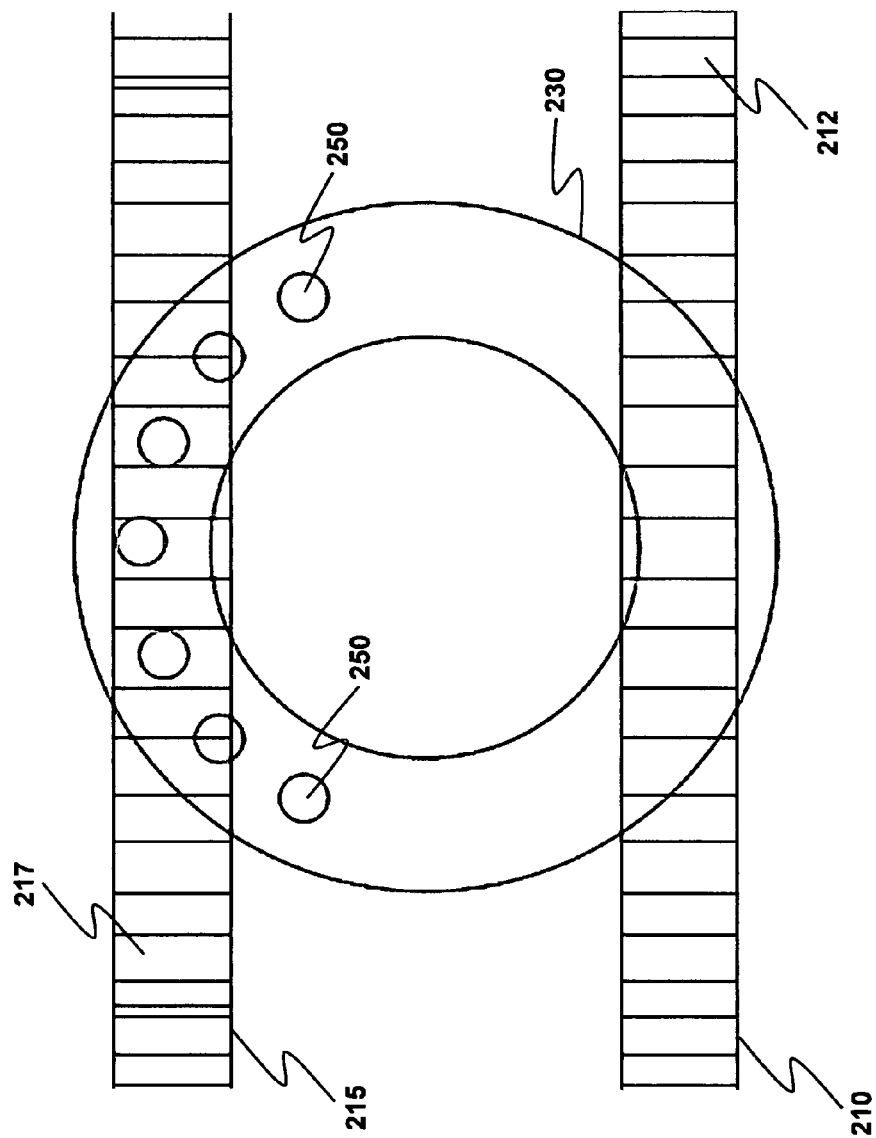
FIG. 13 is a view similar to FIG. 12 showing a different position for a mechanical linkage and more particularly illustrating the fact that engagement is typically with just one gear wheel at a time.

Different disks or gears are engaged depending on whether the angle of inclination with respect to the horizon is increasing (morning) or decreasing (afternoon). FIG. 11 is a more detailed side elevation view illustration an intermeshing engagement between pegs or pins 250 and apertures, pins or slots in disks 210 and 215. FIG. 12 is a view similar to FIG. 10 but providing a somewhat more detailed view of the engagement between disks 210 and 215 and pegs or pins 250. In particular, in FIG. 12 it is noted that the position shown is the midday position when one disk is about to engage the pins (or pegs) and the other disk is about to disengage from them. This aspect is relevant to that aspect of the present invention which provides an increase in the angle of inclination in the morning and a decrease in this angle in the afternoon. FIG. 13 is likewise similar to FIG. 12 except that the disks are shown in a position for which only one of the disks is engaged.

It is noted that in addition to diurnal solar path tracking, the present invention also provides for the ability of horizontal shaft 205 to be lifted, first support platform 220 turned, and then shaft 205 is lowered so that different pins 250 fit into different portions along the periphery of disks 210 and 215. This provides a mechanism for correction for seasonal variations in the solar path. For example, in the summer (in the northern hemisphere) the sun rises earlier and sets later and rises at a different point along the horizon. Alternatively, disengagement is accomplished either by retracting the pins or by lowering the pin support. In the case of friction engagement, any relative separation is sufficient.

In those embodiments of the present invention in which it is desirable to provide seasonal adjustments by raising the structure and repositioning the gear alignment (Note that even if a frictional engagement is employed seasonal adjustment is still possible), first support platform 220 is provided with vertically elongated apertures 221 for supporting horizontal shaft 205. See FIG. 14A. If seasonal adjustment is not employed apertures 221 are preferably circular.

FIGS. 14B and 14C provide a description of the support structure for solar panel 400 which comprises either a photovoltaic panel or solar thermal panel or other technological categories of solar collectors, including combination devices. These figures illustrate how a solar panel may be attached to a post or tracking head of the present invention. In particular, support arms 410 (one on each side of support platform 220) are fixed to panel support 405 to which panel 400 is attached. Support arms 415 are, like arms 410, are both also affixed to horizontal shaft 205 by any convenient means, including welds, rivets and bolts. Arms 410 and 415 along with panel support 405 form a generally triangular configuration. Depending on the number of telescoping sections, the support post is referred to using reference numerals 120, 130, 140 or 150. FIG. 14C illustrates the same structures as shown in FIG. 14B, except that the scale is somewhat different, that it is rotated 90° and that panels 405 and 400 are omitted for clarity. At sunrise and sunset, the array is vertical or near vertical. Azimuthal rotation beyond this point continues to rotate gears 210 or 215, applying a downward force on arm 415, causing it to make contact with chock or fulcrum 420. Further rotation pivots the array end of arm 415 downward, causing shaft 205 to lift, thereby disengaging the pins, gears or other engaging contact.

There are numerous ways in which the telescoping motion of the nested support posts described herein may be accomplished. FIGS. 15A through 15G are intended to provide exemplary mechanisms to accomplish this motion. These figures illustrate pneumatic, hydraulic, cable driven and screw driven systems for carrying out the desired telescoping (raising and lowering) function. In these drawings, previously described features are indicated using the same reference numerals as provided above. These include ground 90, ground segment 100, plate 101 and first telescopic segment 120. Descriptions of these items are found elsewhere and accordingly, it is seen that their descriptions need not be repeated below with respect to the discussions relating to FIGS. 15A through 15G.

Since exact pole height control to the millimeter is not necessary, control mechanisms need not be sophisticated. For example, cable system control may be based on the number of take-up drum revolutions, screw system control by the number of turns, a pneumatic system by a psi indication of air pressure, and a hydraulic system by pressure as well. Alternatively, there are disposed sensors placed on the rising shaft that feedback to the controller, indicating that a desired height has been reached.

Figure 15A:
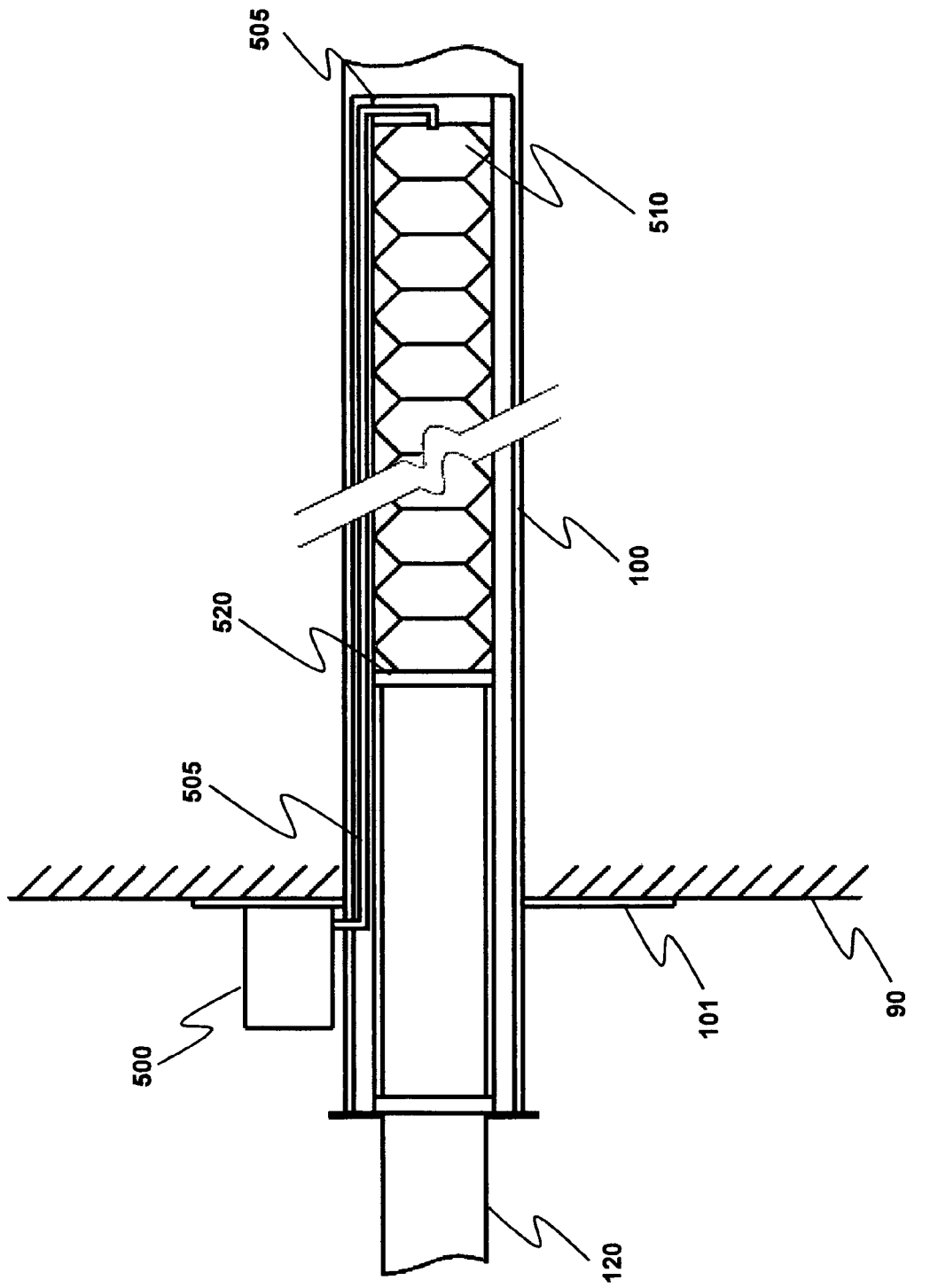
FIG. 15A is a side elevation, cross-sectional view illustrating a pneumatic mechanism for providing telescoping motion.
Figure 15B:
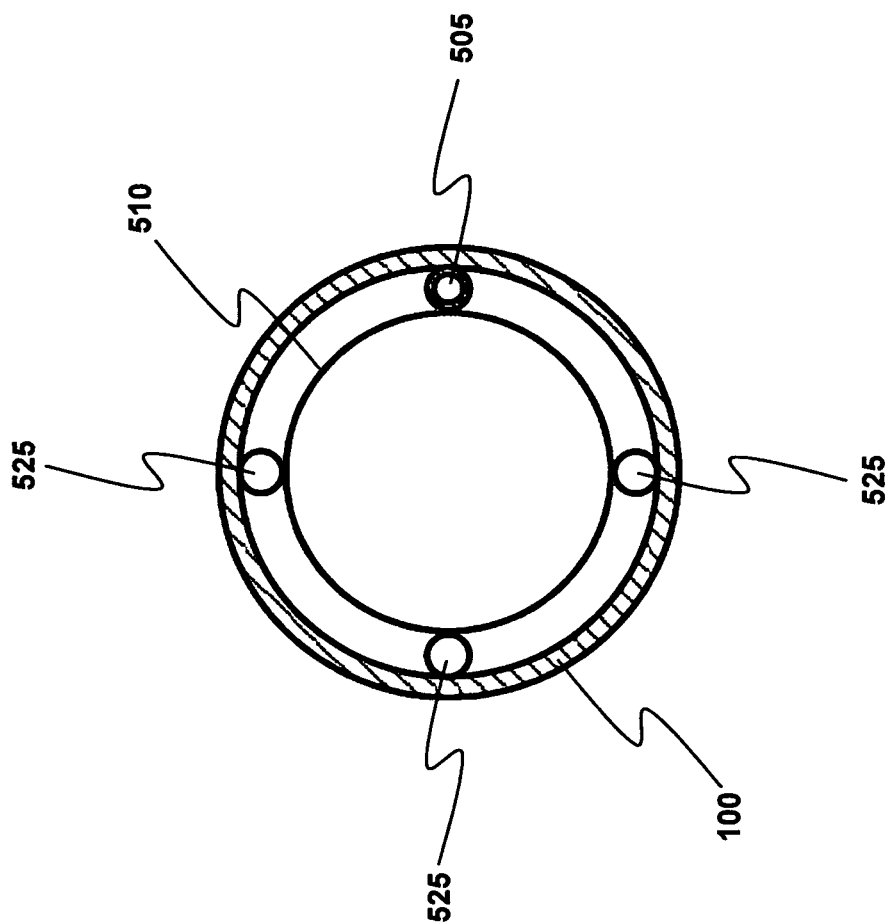
FIG. 15B is a cross-sectional, top view of the pneumatic mechanism seen in FIG. 15B.

In particular, it is seen that FIG. 15A illustrates a pneumatic device for raising and lowering segment 120. This is accomplished through the presence of bellows 510 disposed within segment 100 and below segment 120. Support plate 520 is preferably provided at the top of bellows 510 to provide support and guidance during the motion. Bellows 510 is inflated from compressor 500 via airline 505 which extends downwardly within the annular space between segments 100 and 120. At least one valve (not shown) is employed to release air from within bellows 510 to effect a lowering of segment 120. Bellows 510 comprises any convenient material such as rubber or a synthetic flexible polymeric material. FIG. 15B provides a cross sectional view of a lower portion of the apparatus illustrated in FIG. 15A. in particular, it is seen that bellows guides 525 are provided between bellows 510 and the inner wall of segment 100. Furthermore, it is seen that air supply line 505 serves as both a guide and also as a fluid flow line for providing pressurized air from compressor 500 to the lower portion of bellows 510.

Figure 15C:
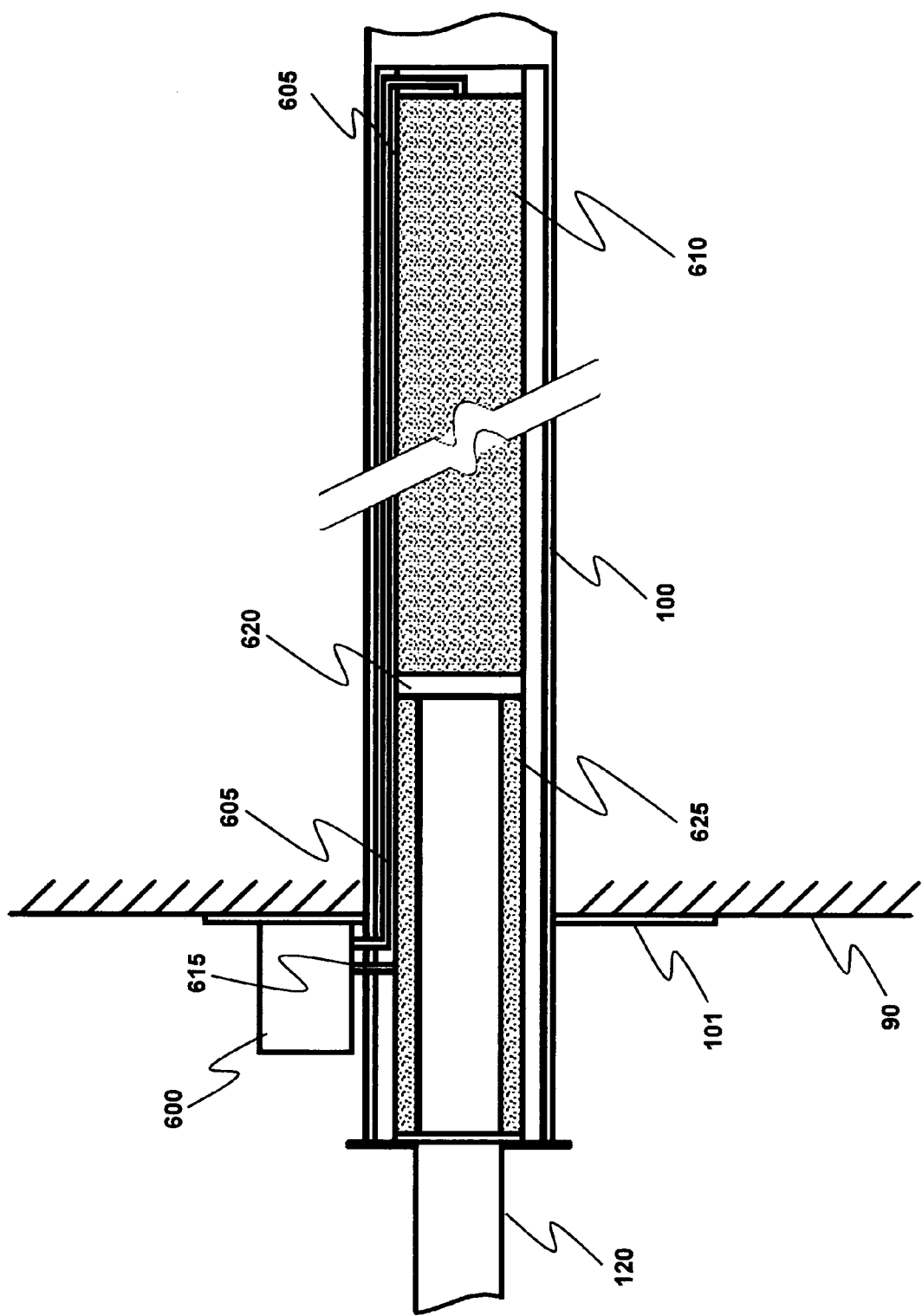
FIG. 15C is a view similar to FIG. 15A except showing a hydraulically driven mechanism for providing telescoping segments.

FIG. 15C provides a view of a telescopic mechanism similar to FIG. 15A, except that here the fluid medium is a liquid such as a suitable hydraulic fluid. In this embodiment, hydraulic fluid pump 600 supplies hydraulic fluid 610 to the volume beneath sealing plate 620 through a hydraulic line 605. This line supplies hydraulic fluid 610 to the volume below plate 620. Hydraulic fluid 625 is returned to compressor is 600 through conduit 615. By controlling fluid pressure in lines 605 and 615, telescoping of the segments is thus made possible.

Figure 15D:
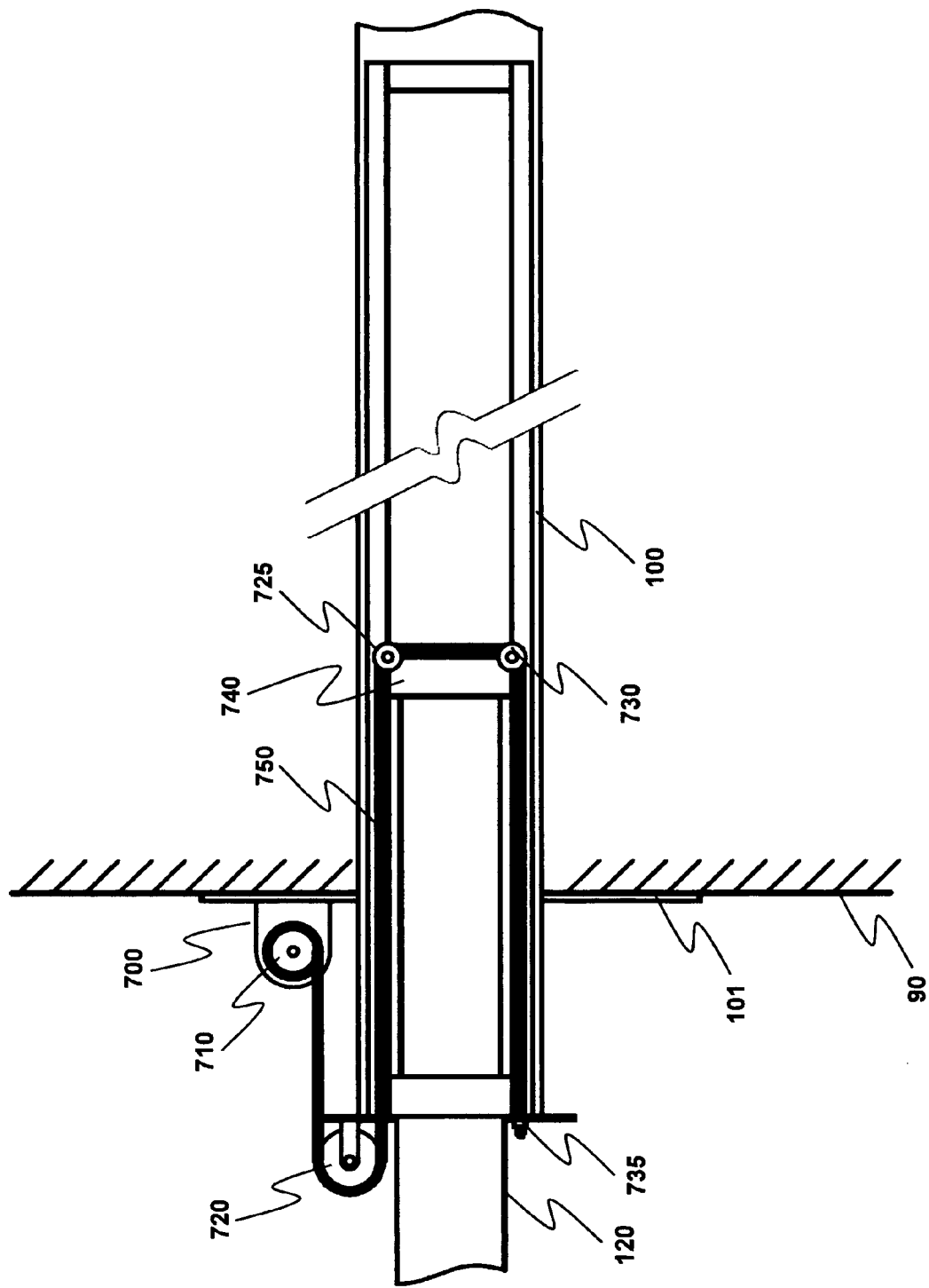
FIG. 15D is a view similar to FIG. 15A except showing a cable based mechanism for providing telescoping segment action.
Figure 15E:
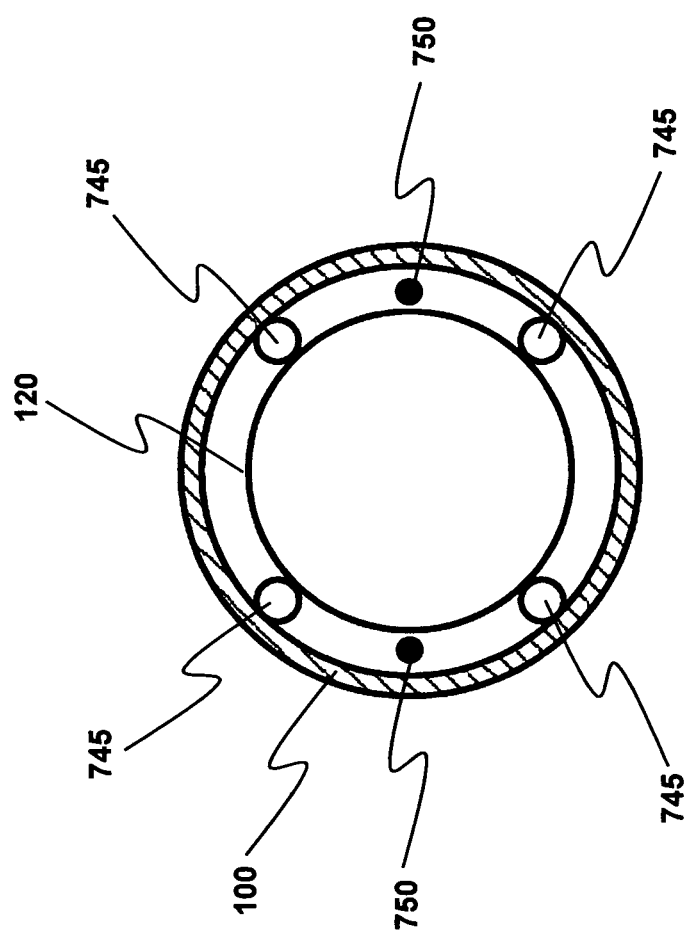
FIG. 15E is a cross-sectional, top view of the cable mechanism seen in FIG. 15D.

FIG. 15D illustrates yet another mechanism by which one or more of the segments can be extended outwardly from ground segment 100. In this particular embodiment, a cable mechanism is employed. In particular, drive motor 700 turns wholly 710 on which cable 750 is wound. Table 750 is deployed so as to extend up and over pulley 720 and which then descends downwardly within the annular space between ground segment 101 and extendable segment 120. At the bottom of segment 120 there are disposed a pair of pulleys, 725 and 730. These two pulleys are mounted on the bottom of guide plate 740 so as to facilitate the telescopic motion of segment 120. Following its positioning in pulley 730, cable 750 then extends upwardly to fixed point 735. Operation of motor 700 serves to raise and lower segment 120. FIG. 15E is a cross-sectional view similar to that shown in FIG. 15B. However, in this view, guides 745 are seeing disposed in the annular volume between ground segment 100 and telescoping segment 120. More particularly, with respect to this particular embodiment, cable 750 is seen as descending on one side of segment 120 and rising on its opposite side.

Figure 15F:
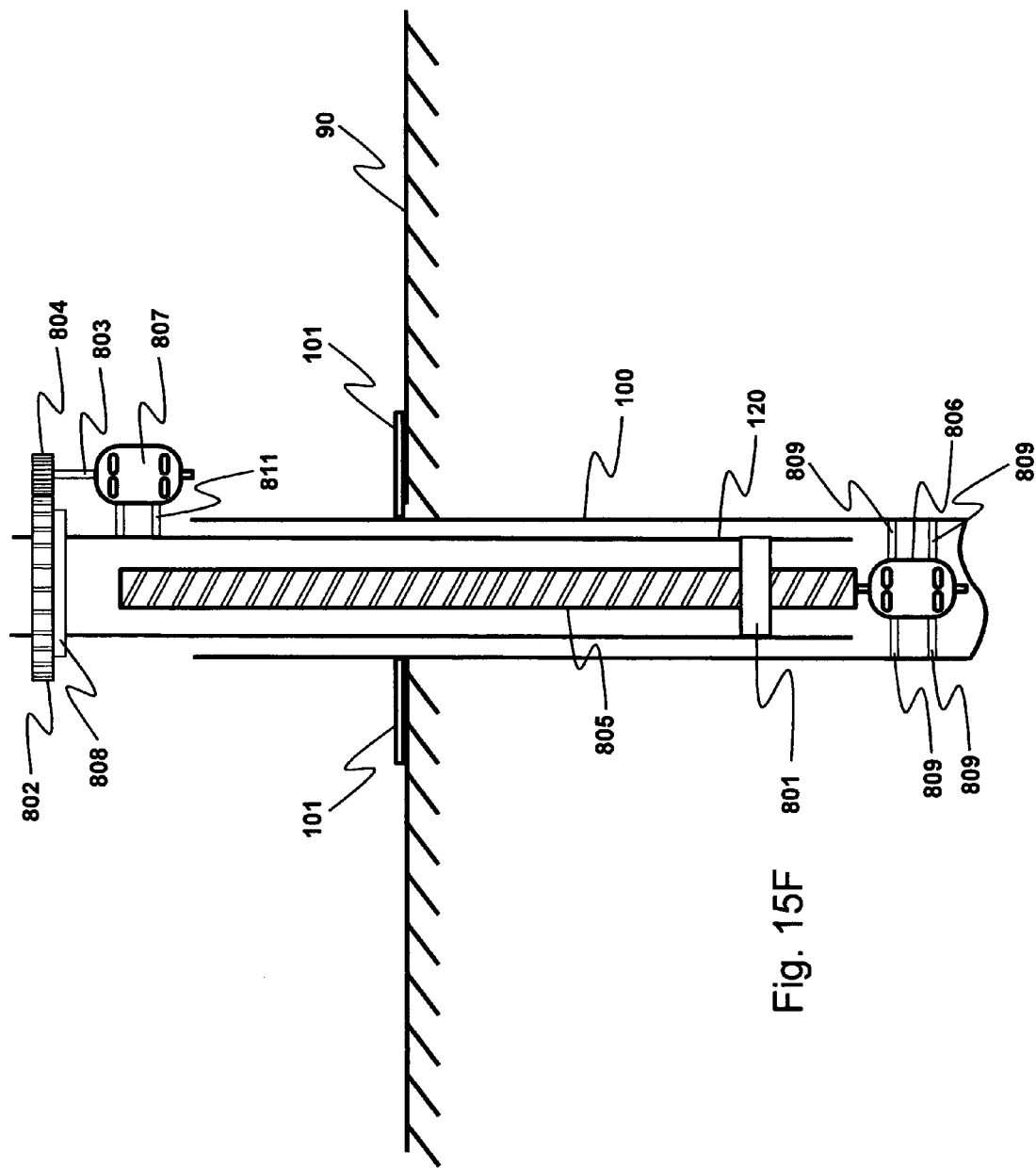
FIG. 15F is a view similar to FIGS. 15A, 15C and 15D except showing a screw based mechanism for providing telescoping segment action.
Figure 15G:
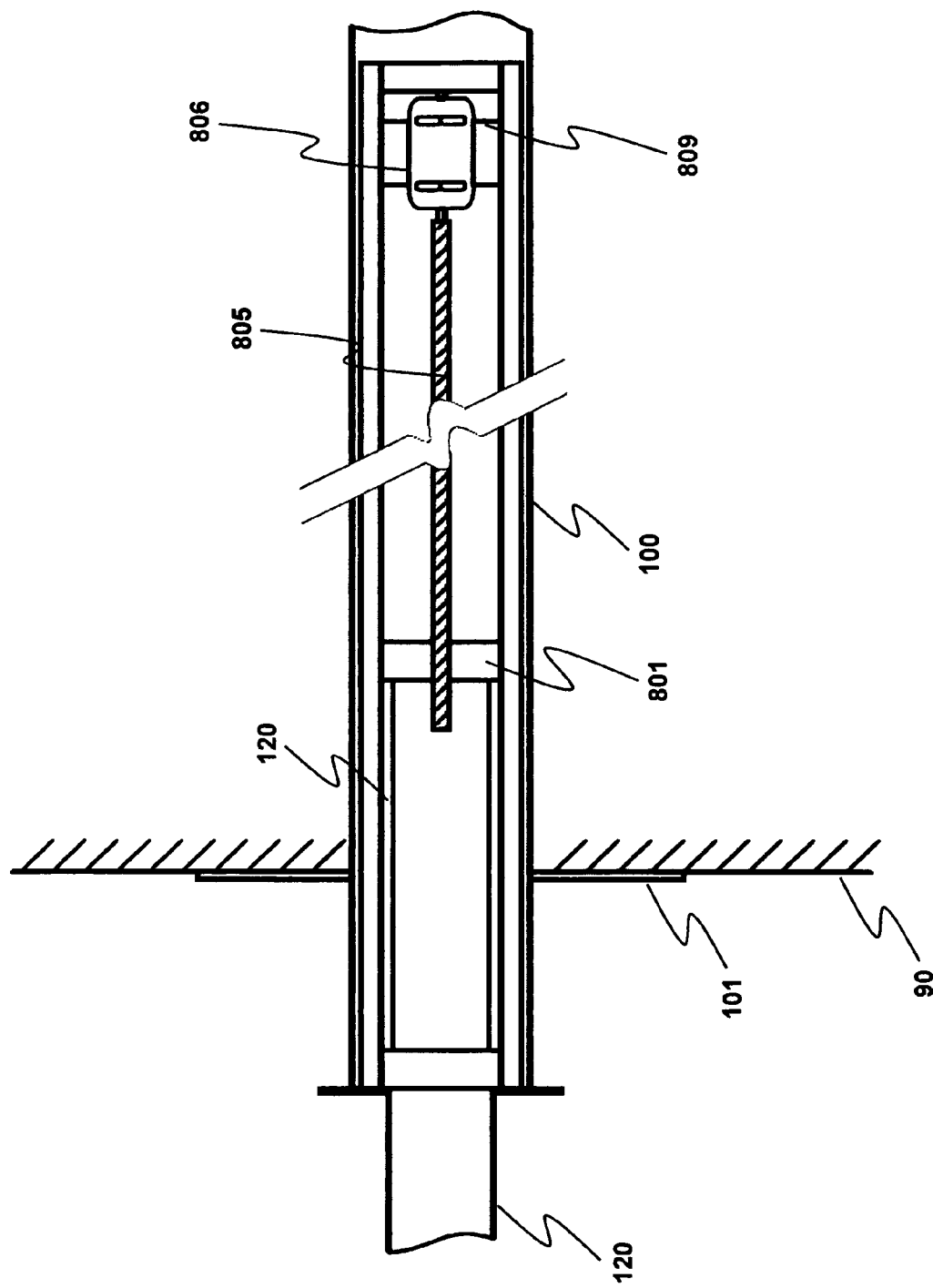
FIG. 15G is an alternate view similar to FIG. 15F showing a screw based telescoping mechanism which more particularly shows the sections in a different relative position.

FIG. 15F illustrates a screw based system for providing telescoping action for the solar energy collection system in accordance with yet another embodiment of the present invention. The present description is focused on those aspects of the present invention that are specifically directed to screw-based telescoping operations. Screw 805 is disposed within the innermost tube segment (here 120). Screw 805 is driven by motor 806 which is controlled by controller 300 (see FIG. 16). Motor 806 is supported within the base of tube 100 by support brackets 809. Screw 805 is disposed through threaded collar or nut 801 which is affixed to the inner wall of tube 120. It is noted that motor 806 may also be disposed within the rising tube and geared to the screw. FIG. 15F illustrates a retracted or non-telescoped position of the apparatus. FIG. 15G is similar to FIG. 15F except that telescopic and portion 120 is shown in an extended position.

As shown in FIG. 15F, motor 807 is affixed to inner tube segment 120 by means of brackets or supports 811. Motor 807 drives pinion gear 804 via shaft 803. Pinion gear 804 in turn drives main gear 802 which provides relative rotational motion between first platform 220 and second platform 230.

Figure 16:
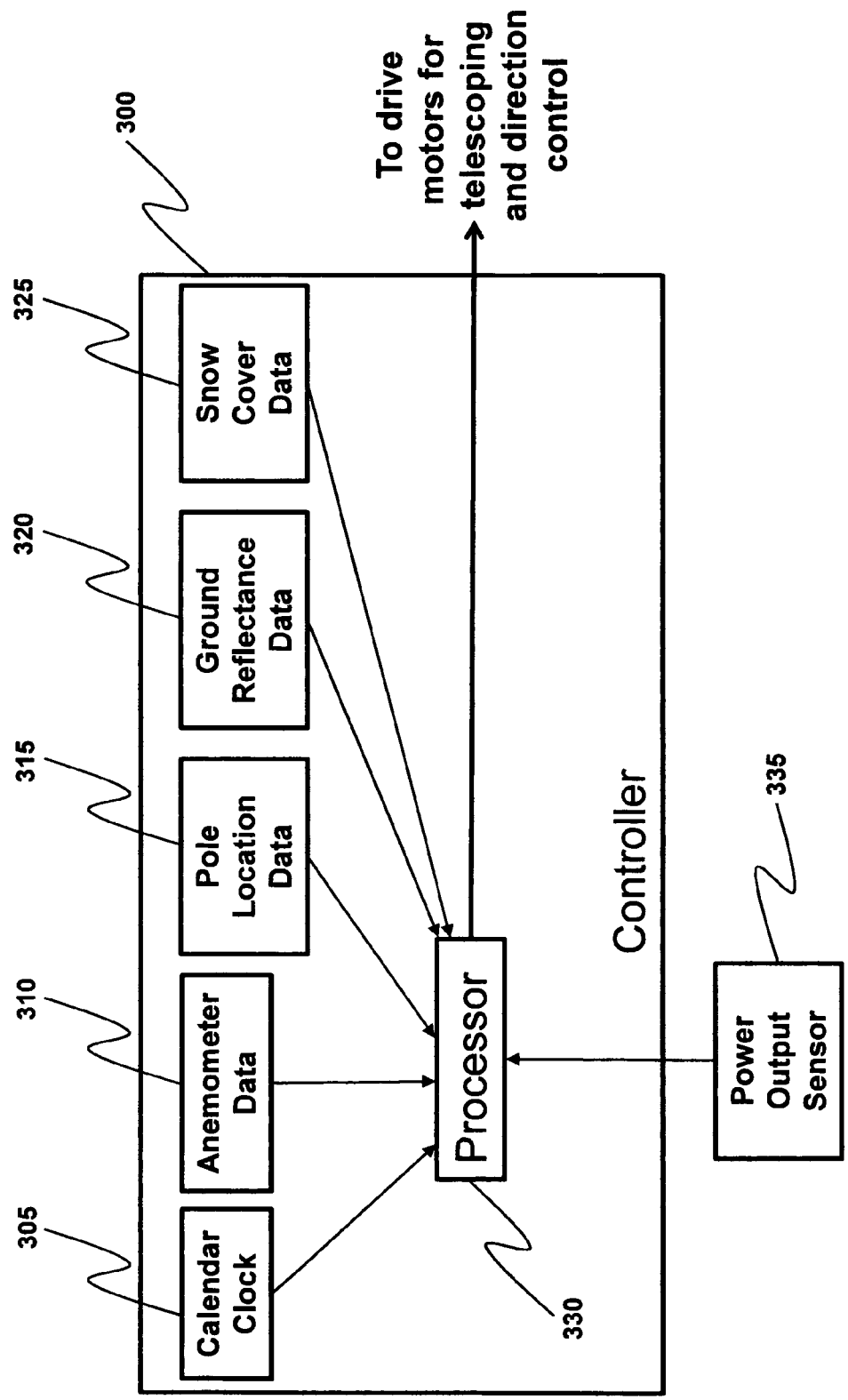
FIG. 16 is a block diagram view illustrating the components of a controller used in conjunction with the present invention to provide the desired panel motions.

FIG. 16 illustrates, in block diagram form the components that go into controller 300 for several of the aspects of the present invention. In particular, controller 300 includes processor 330 which drives signal lines to control motors or electro-mechanical devices for providing telescoping and also for providing rotary motion of first (upper) support platform 220 with respect to second (lower) platform 230. It also controls an electromechanical device for raising shaft 205 to adjust for seasonal variations as well. Processor 330 is provided with information from several sources. Most importantly, processor 330 receives time and date information from calendar/clock unit 305. Of next most importance, processor 330 receives information describing the position of the supporting pole structure vis a vis other poles in the array. Latitude and longitude may also be provided. Provision of "pole location data" is indicated by block 315 which is preferably provided from and stored in a non-volatile memory. This data is provided during initial installation and set up. Lastly, and optionally, processor 330 (which also includes memory storage for control programs) is also provided with anemometer data 315 from an anemometer. It is noted that only a single anemometer is generally required for a given panel array. The anemometer, if employed, is preferably mounted above one of the panels in the array. In the event of high wind conditions, it is often the case that electrical power for system operation is unavailable. Accordingly, in such cases it is desirable to provide a mechanically driven fail safe device, which is actuated by high wind speed and which then acts to lower the panels. For example, such a failsafe device is provided by a centrifugally driven governor which acts to open a valve for the release of air or hydraulic fluid.

Figure 17:
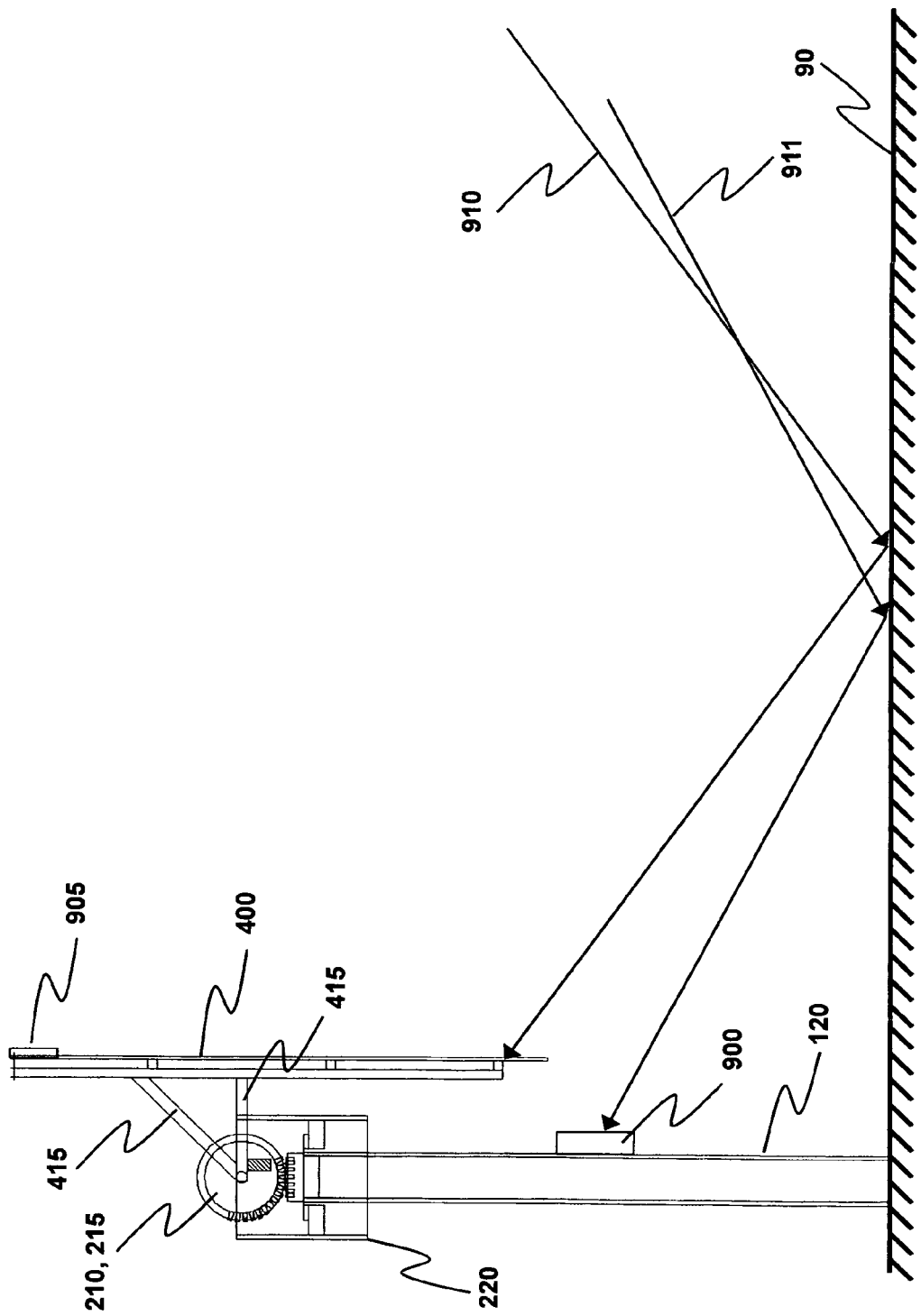
FIG. 17 is a side elevation view illustrating the situation in which ground reflectance is a factor and how its presence is detected and utilized to improve energy output.

In addition to the control functions provided above, there is also provided input from ground reflectance sensor 900 which is preferably mounted on one of the support poles for an array (or even on one pole in a single panel installation). See FIG. 17. In regions where snow is a factor, it is possible to take advantage of the fact that it provides additional insolation advantages in that, not only is direct light available, but indirect or reflected light is also available. The importance of capturing ground reflectance is illustrated in FIG. 17 by the presence of rays 910 and 911 reflected from ground 90, as for example, because of snow cover. Ray 910 is seen to provide an indication of reflected light energy from ground 90 to sensor 900. This means that additional radiation is available for solar panel 400, as illustrated by ray 910. In those circumstances in which ground reflectance is determined to be of value, the panel(s) are tilted (typically initially downward) to a point at which power output is observed to be maximal. For this purpose, power sensor 335 provides a signal to processor 330 which controls the tilt to produce maximum power.

Attention is now focused on how one may control tilt independently of horizontal positioning. Since disengagement of the gears/teeth (212, 217, 250) occurs with rotation past sunrise (as described herein), tracking head 200 can be rotated counterclockwise further still to engage a lifting mechanism such as a ramp, slot or lip which raises the assembly a sufficient distant to allow for a disengagement that keeps tracking head 200 from dropping back into place and re-engaging the gears. When the unit is rotated clockwise past the sunset position at the end of the day, the lifting mechanism is released and the gears re-engage. The advantage of this approach is that the same single rotational drive mechanism is used to accomplish the disengagement/reengagement, and the array can remain in a vertical position until it is desired to reverse the lifting mechanism and have the gears re-engage. This provides an easy technique for achieving vertical collector array positioning throughout the arc of the day.

Another advantage to the tracking system of the present invention is the ability to lower itself during high wind conditions. In such conditions, the array is tipped to a horizontal position as well as being lowered, which then presents the smallest profile to the wind. Tracking head 200, as previously described, resets it's tilt by repeated gear re-engagement to a horizontal or near horizontal position. If this occurs in winter when the collectors are near vertical to receive the winter sun (in the Northern Hemisphere), then it takes several reset operations to get near horizontal.

Another way to approach the issue of controlling tilt independently of horizontal position is to incorporate a small linear actuator, piston, solenoid, or similar device in shaft 240 (See FIG. 8 for a view of shaft 240). When the collectors are at sunrise or sunset (that is, more to the vertical), the piston is activated to lift the horizontal shaft assembly and to disengage the gears. This is best done at sunrise or sunset since at these times, there is almost no rotational force on the horizontal shaft if the array is tilted. The piston stays in the "lift" position as long as desired, allowing rotation of the array without tilt change.

This second approach to this issue introduces the capability of the device to "drop down" into any position of the horizontal arc, and therefore to engage the gears in any relative position desired. The previous approach for re-engaging the gears after disengagement rotates back after "over rotation" and "drop down" into a new position.

Although this second approach introduces another driver, the added cost is outweighed by the reduction in wear and tear, and the simplicity of disengagement, repositioning and re-engagement without the necessity of repeated rotations. As stated herein, the first approach for "skipping a tooth" involved re-engagement during a rotational movement and, in addition to being somewhat more difficult, would appear to represent more wear and tear on the gears (or any of the other engagement mechanism described herein). The simplicity of disengagement with a switch, freeing the array to swivel, as compared to a fulcrum and "prying" action to disengage the gears provides a tradeoff between greater and easier control versus less cost but more complicated motions.

The first approach herein of making collectors 400 horizontal or nearly horizontal during high winds, as described herein involves repeat rotations to change gear positions. The second approach or "switch" option allows the gears to disengage, and the array need only rotate once to the proper location, drop down to re-engage and rotate to due south (or to any desired orientation) to achieve horizontal placement. Either approach accomplishes the goal of reducing wind resistance when desired.

Yet another approach to this problem is to provide individual or group controls which move pins 250 into and out of platform structure 230. Individual pins may be selected for engagement or not; groups of pins from either end or from the middle of the arc may be moved; the whole set of pins may also be selected for retraction or extension.

It is also to be noted that controller 300 also is capable of receiving input from sensor 905 (see FIG. 17) which detects snow coverage on one or more of the solar panels and operates to provide relevant data 325 to processor 330 which then operates to control the panels so as to tilt them to rid them of snow. A vibratory motion is also impartable to the array to further enhance automatic snow removal.

While the present invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A solar tracking device comprising:
a first platform for supporting at least one solar panel;
a rotatable horizontal shaft supported by said first platform;
at least one circular disk affixed to said horizontal shaft, said at least one circular disk including, on the periphery thereof, first engagement means;
a vertical shaft which supports said rotatable horizontal shaft and which enables said solar panel and said first platform to move in a horizontal direction; and
a second platform supporting said vertical shaft, said second platform having second engagement means disposed thereon in contact with said first engagement means, so as to enable said solar panel and said first platform to be pivoted in an azimuthal direction upon relative rotation of said first and second platforms on said vertical shaft.

2. The device of claim 1 in which said first engagement means is selected from the group consisting of gear teeth, holes, pins and slots and wherein said second engagement means is oppositely configured to provide engagement.

3. The device of claim 1 in which said first and said second engagement means comprises surfaces which are engaged frictionally.

4. The device of claim 1 in which said horizontal shaft is supported by said first platform within slots which permit motion of said horizontal shaft which disengages said first and second engagement means.

5. The device of claim 1 which further includes a biasing device to urge said horizontal shaft in a downward direction.

6. The device of claim 1 further including a solar collector supported by said first platform.

7. The device of claim 6 in which said solar collector is selected from the group consisting of a photovoltaic panel and a solar thermal panel.

8. The device of claim 1 in which said first platform comprises a cylindrical structure.

9. The device of claim 1 further including a bearing support to permit relative rotational motion between said first and second platforms.

10. The device of claim 1 in which there are two disks configured so that only one of which is engaged with said second engagement means.

* * * * *